(12) United States Patent
Nakajima

(10) Patent No.: US 11,614,651 B2
(45) Date of Patent: Mar. 28, 2023

(54) LIQUID CRYSTAL DEVICE AND ELECTRONIC APPARATUS

(71) Applicant: SEIKO EPSON CORPORATION, Tokyo (JP)

(72) Inventor: Osamu Nakajima, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/382,706

(22) Filed: Jul. 22, 2021

(65) Prior Publication Data
US 2022/0026759 A1  Jan. 27, 2022

(30) Foreign Application Priority Data
Jul. 23, 2020 (JP) .............................. JP2020-125894

(51) Int. Cl.
| | |
|---|---|
| G02F 1/1333 | (2006.01) |
| G02F 1/1343 | (2006.01) |
| G02F 1/13363 | (2006.01) |
| G02F 1/1335 | (2006.01) |
| G03B 21/00 | (2006.01) |

(52) U.S. Cl.
CPC .... G02F 1/133368 (2021.01); G02F 1/13355 (2021.01); G02F 1/13439 (2013.01); G02F 1/133553 (2013.01); G02F 1/133638 (2021.01); G02F 1/133634 (2013.01); G02F 2203/02 (2013.01); G02F 2413/03 (2013.01); G02F 2413/10 (2013.01); G03B 21/006 (2013.01)

(58) Field of Classification Search
None
See application file for complete search history.

(56) References Cited

U.S. PATENT DOCUMENTS

| | | |
|---|---|---|
| 6,295,109 B1 | 9/2001 | Kubo et al. |
| 2001/0055082 A1* | 12/2001 | Kubo ................ G02F 1/133371 349/114 |
| 2005/0018118 A1 | 1/2005 | Kubo et al. |
| 2005/0041185 A1 | 2/2005 | Tanaka et al. |

(Continued)

FOREIGN PATENT DOCUMENTS

| | | |
|---|---|---|
| JP | 2001-318371 A | 11/2001 |
| JP | 2001-343653 A | 12/2001 |

(Continued)

*Primary Examiner* — Ryan Crockett
(74) *Attorney, Agent, or Firm* — Oliff PLC

(57) ABSTRACT

A liquid crystal device includes a reflection-type liquid crystal panel in which a first substrate provided with a reflective layer and a second substrate having light-transmissivity face each other via a liquid crystal layer. In the liquid crystal device, a λ/4 phase difference plate is arranged in an optical path in which light incident from the second substrate side is reflected by the reflective layer and emitted from the second substrate side, and a phase difference compensation layer such as a C plate and O plate provided integrally with the liquid crystal panel is provided in the optical path. The λ/4 phase difference plate is an inorganic material film provided on a second end surface facing the second substrate in the polarized light separating element. The phase difference compensation layer is an inorganic material film provided on a surface of the second substrate opposite to the liquid crystal layer.

15 Claims, 16 Drawing Sheets

(56) References Cited

U.S. PATENT DOCUMENTS

| | | |
|---|---|---|
| 2005/0270455 A1 | 12/2005 | Kubo et al. |
| 2007/0002227 A1 | 1/2007 | Kubo et al. |
| 2007/0019138 A1 | 1/2007 | Kubo et al. |
| 2007/0195237 A1 | 8/2007 | Kubo et al. |
| 2010/0201928 A1 | 8/2010 | Kubo et al. |
| 2010/0231835 A1* | 9/2010 | Nakagawa ........... H04N 9/3105 349/187 |
| 2010/0245689 A1* | 9/2010 | Masuda ............... H04N 9/3167 349/8 |
| 2010/0283950 A1 | 11/2010 | Kubo et al. |
| 2011/0043712 A1* | 2/2011 | Yamakawa ............ G03B 33/12 349/9 |
| 2011/0181801 A1* | 7/2011 | Okumura ........... G03B 21/2073 349/5 |
| 2011/0194057 A1* | 8/2011 | Haruyama ........... H04N 9/3141 349/117 |
| 2011/0279742 A1* | 11/2011 | Endo ..................... H04N 9/315 349/8 |
| 2012/0013826 A1 | 1/2012 | Kubo et al. |
| 2012/0236218 A1* | 9/2012 | Haruyama ......... G03B 21/2073 349/5 |
| 2019/0004344 A1* | 1/2019 | Haruyama ........ G02F 1/133634 |

FOREIGN PATENT DOCUMENTS

| | | |
|---|---|---|
| JP | 2003-186015 A | 7/2003 |
| JP | 2005-055638 A | 3/2005 |
| JP | 2005-062787 A | 3/2005 |
| JP | 3655911 B2 | 6/2005 |
| JP | 4138782 B2 | 8/2008 |
| JP | 2009-145464 A | 7/2009 |

* cited by examiner

LIQUID CRYSTAL DEVICE AND ELECTRONIC APPARATUS

The present application is based on, and claims priority from JP Application Serial Number 2020-125894, filed Jul. 23, 2020, the disclosure of which is hereby incorporated by reference herein in its entirety.

BACKGROUND

1. Technical Field

The present disclosure relates to a liquid crystal device provided with a reflection-type liquid crystal panel and an electronic apparatus.

2. Related Art

A transmission-type liquid crystal device used as a light valve or the like of a projection-type display device includes a pair of polarizing plates and a transmission-type liquid crystal panel arranged in an optical path between the pair of polarizing plates. In the transmission-type liquid crystal device, after linearly polarized light that has transmitted through the polarizing plate at an incidence side is incident on the liquid crystal panel, the light that has transmitted through the polarizing plate at an emission side is used for display among the light emitted from the liquid crystal panel. In such a liquid crystal device, as a measure against a disclination when trying to narrow a pitch of pixels and the like, arranging λ/4 phase difference plates between a polarizing plate on the incident side and the liquid crystal panel, and between a polarizing plate on the emission side and the liquid crystal panel, thereby preventing the deterioration of the modulation characteristics that occurs when the angle formed by the orientation direction of the liquid crystal molecules and the optical axis of the polarizing plate deviates from 45°, have been proposed (for example, JP-A-2001-318371, JP-A-2005-62787).

In a liquid crystal device, contrast and visual field angle characteristics may be impaired due to an influence of pre-tilt of liquid crystal molecules and the like. Therefore, JP-A-2001-318371 further describes a configuration in which a phase difference compensation member having negative refractive index anisotropy is provided between the liquid crystal panel and the λ/4 phase difference plate on the emission side. However, the configuration may become complicated when the λ/4 phase difference plate is provided between the liquid crystal panel and the polarizing plate, and the phase difference compensation member is further provided between the λ/4 phase difference plate and the liquid crystal panel. Such a problem also occurs when the liquid crystal panel is reflection-type. Therefore, when manufacturing an electronic apparatus such as a projection-type display device using a reflection-type liquid crystal panel, there is a problem in that the space around the liquid crystal panel is limited, and the labor required to align the optical members increases.

SUMMARY

In order to solve the above-described problems, the liquid crystal device according to the present disclosure includes a reflection-type liquid crystal panel in which a first substrate provided with a reflection layer and a second substrate having light-transmissivity face each other via a liquid crystal layer, a λ/4 phase difference plate arranged in an optical path in which light incident from the second substrate side is reflected by the reflection layer and emitted from the second substrate side, and a phase difference compensation layer provided integrally with the liquid crystal panel in the optical path.

The liquid crystal apparatus according to the invention can be used for electronic apparatuses including cellular phones, mobile computers, and projection-type display apparatuses, for example.

DESCRIPTION OF EXEMPLARY EMBODIMENTS

Figure 1:
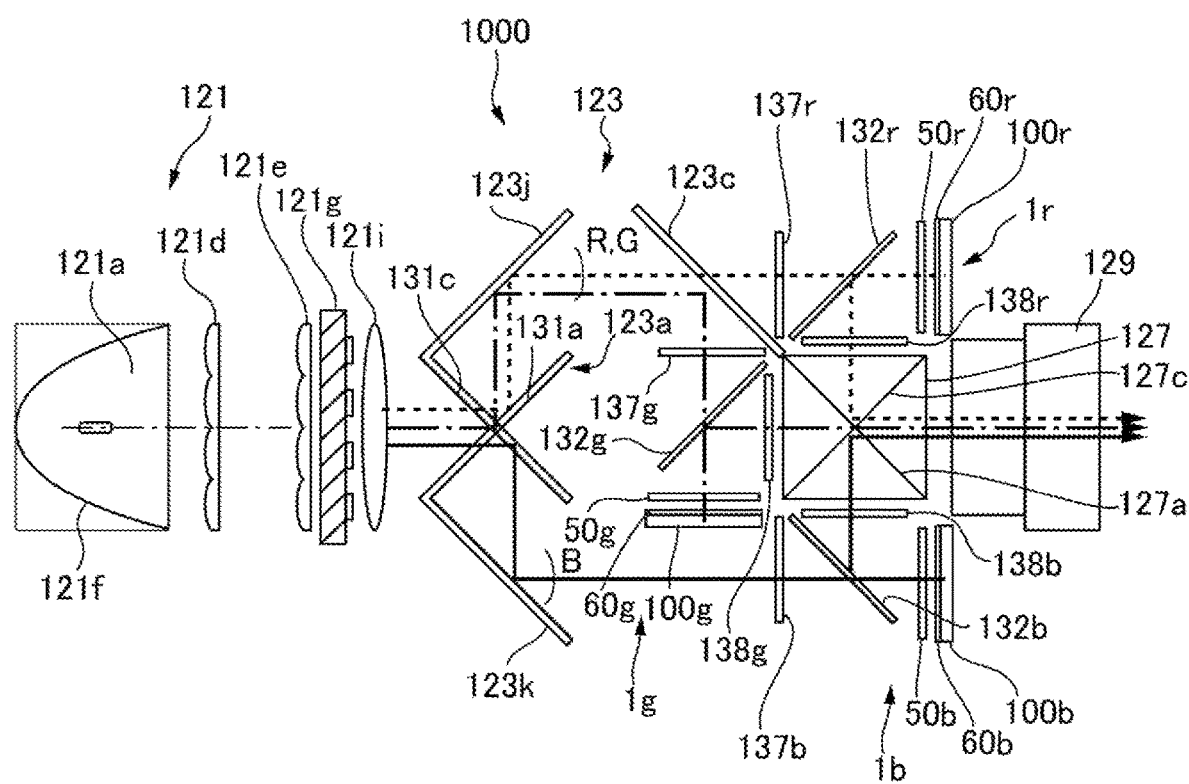
FIG. 1 is a schematic block diagram illustrating a projection-type display device employing a liquid crystal device according to Exemplary Embodiment 1 of the present disclosure.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Further, in the following description, when explaining the direction and orientation of the optical axis and the like, when the liquid crystal panel 100 is viewed from the second substrate 20 side, the side where the flexible wiring substrate 105 is connected to the liquid crystal panel 100 is referred to as a 6 o'clock direction of the clock, an opposite side to the side where the flexible wiring board 105 is connected to the liquid crystal panel 100 is referred to as a 0 o'clock direction of the clock, the right direction is referred to as a 3 o'clock direction of the clock, and the left direction is referred to as a 9 o'clock direction of the clock. Further, in the following description, one of linearly polarized light whose vibration directions of the electric field are orthogonal to each other is referred to as P-polarized light, and the other is referred to as S-polarized light.

Exemplary Embodiment 1

1. Configuration of Projection-Type Display Device 1000

With reference to FIG. 1, a projection-type display device is illustrated as an example of an electronic apparatus using a liquid crystal device that employs the present disclosure. FIG. 1 is a schematic block diagram illustrating a projection-type display device 1000 employing a liquid crystal device according to Exemplary Embodiment 1 of the present disclosure. Since the projection-type display device 1000 illustrated in FIG. 1 uses a plurality of liquid crystal devices to which light in a different wavelength region from each other is supplied, a liquid crystal device corresponding to red color light R is referred to as a liquid crystal device 1r, a liquid crystal device corresponding to green color light G is referred to as a liquid crystal device 1g, and a liquid crystal device corresponding to blue color light B is referred to as a liquid crystal device 1b.

The projection-type display device 1000 illustrated in FIG. 1 includes a light source unit 121 configured to generate light source light, a color-separating and light-guiding optical system 123 configured to separate the light source light emitted from the light source unit 121 into three colors of red, green, and blue, and three liquid crystal devices 1r, 1g, and 1b configured to modulate the light source light of each color emitted from the color-separating and light-guiding optical system 123. The projection-type display device 1000 also includes a synthetic optical system having a cross dichroic prism 127 configured to synthesize the image light of each color emitted from the liquid crystal devices 1r, 1g, and 1b, and a projection optical system 129 configured to project the image light having passed through the cross dichroic prism 127 onto a non-illustrated screen.

The light source unit 121 includes a light source 121a, a pair of fly eye optical systems 121d and 121e, a polarization conversion member 121g, and a superimposing lens 121i. In this embodiment, the light source unit 121 includes a reflector 121f having a paraboloidal surface and emits parallel light. The fly eye optical systems 121d and 121e each include a plurality of element lenses arranged in a matrix pattern in a plane orthogonal to the optical axis of the system, to divide the source light and individually condense and diverge the divided light. The polarization conversion member 121g converts the light source light exiting from the fly eye optical system 121e exclusively into, for example, a p-polarized light component parallel to the drawing sheet surface and provides such light to the optical system on the downstream side of the optical path. The superimposing lens 121i appropriately converges, as a whole, the light source light having passed through the polarization conversion member 121g, to thereby allow each of liquid crystal panels 100r, 100g, and 100b provided in the liquid crystal devices 1r, 1g, and 1b to uniformly perform superimposed projection.

The color-separating and light-guiding optical system 123 includes a cross dichroic mirror 123a, a dichroic mirror 123c, and reflection mirrors 123j and 123k. In the color-separating and light-guiding optical system 123, substantially white source light from the light source unit 121 is incident on the cross dichroic mirror 123a. Red color light R reflected by a first dichroic mirror 131a included as one of the two components in the cross dichroic mirror 123a is reflected by the reflection mirror 123j, and is then transmitted through the dichroic mirror 123c, to be incident on the liquid crystal panel 100r for red color light R, through a first polarizing plate 137r, a polarized light separating element 130r, and a λ/4 phase difference plate 50r, in the liquid crystal device 1r.

Green color light G reflected by the first dichroic mirror 131a is reflected by the reflection mirror 123j, and further reflected by the dichroic mirror 123c, and is then incident on the liquid crystal panel 100g for green color light G, through a first polarizing plate 137g, a polarized light separating element 130g, and a λ/4 phase difference plate 50g, in the liquid crystal device 1g.

Blue color light B reflected by a second dichroic mirror 131c included as the other of the two components in the cross dichroic mirror 123a is reflected by the reflection mirror 123k, and is then incident on the liquid crystal panel 100b for blue color light B, through a first polarizing plate 137b, a polarized light separating element 130b, and a λ/4 phase difference plate 50b, in the liquid crystal device 1b.

In the projection-type display device 1000 thus configured, the red color light R, the green color light G, and the blue color light B are modulated in the liquid crystal panels 100r, 100g, and 100b. On this occasion, the s-polarized component included in the modulated light exiting from the liquid crystal devices 100r, 100g, and 100b and then passing through the λ/4 phase difference plates 50r, 50g, and 50b are each reflected by the polarized light separating elements 130r, 130g, and 130b, and are then incident on the cross dichroic prism 127 through second polarizing plates 138r, 138g, and 138b. The cross dichroic prism 127 includes a first dielectric multilayer film 127a and a second dielectric multilayer film 127c formed as intersecting each other in a cross shape, the former one the first dielectric multilayer film 127a reflects red color light R and the latter one the second dielectric multilayer film 127c reflects blue color light B. Accordingly, the three color lights are synthesized together in the cross dichroic prism 127, and is then emitted to the projection optical system 129. Then, the projection optical system 129 projects the color image light synthesized in the cross dichroic prism 127, to a non-illustrated screen in a desired magnification.

As described later with reference to FIG. 4, in the projection-type display device 1000, three liquid crystal devices 1r, 1g, and 1b are provided with phase difference compensation layers 60r, 60g, and 60b that adjust the polarization state of incident light to the liquid crystal panel 100 and emitted light from the liquid crystal panel 100, and thereby optically compensate the characteristics of the liquid crystal layer.

Note that the projection-type display apparatus may include a configuration in which an LED light source or the like configured to emit light of each color is used as a light source unit and the light of each color emitted from the LED light source is supplied to another liquid-crystal device.

2. Configuration of Liquid Crystal Device 1

Figure 2:
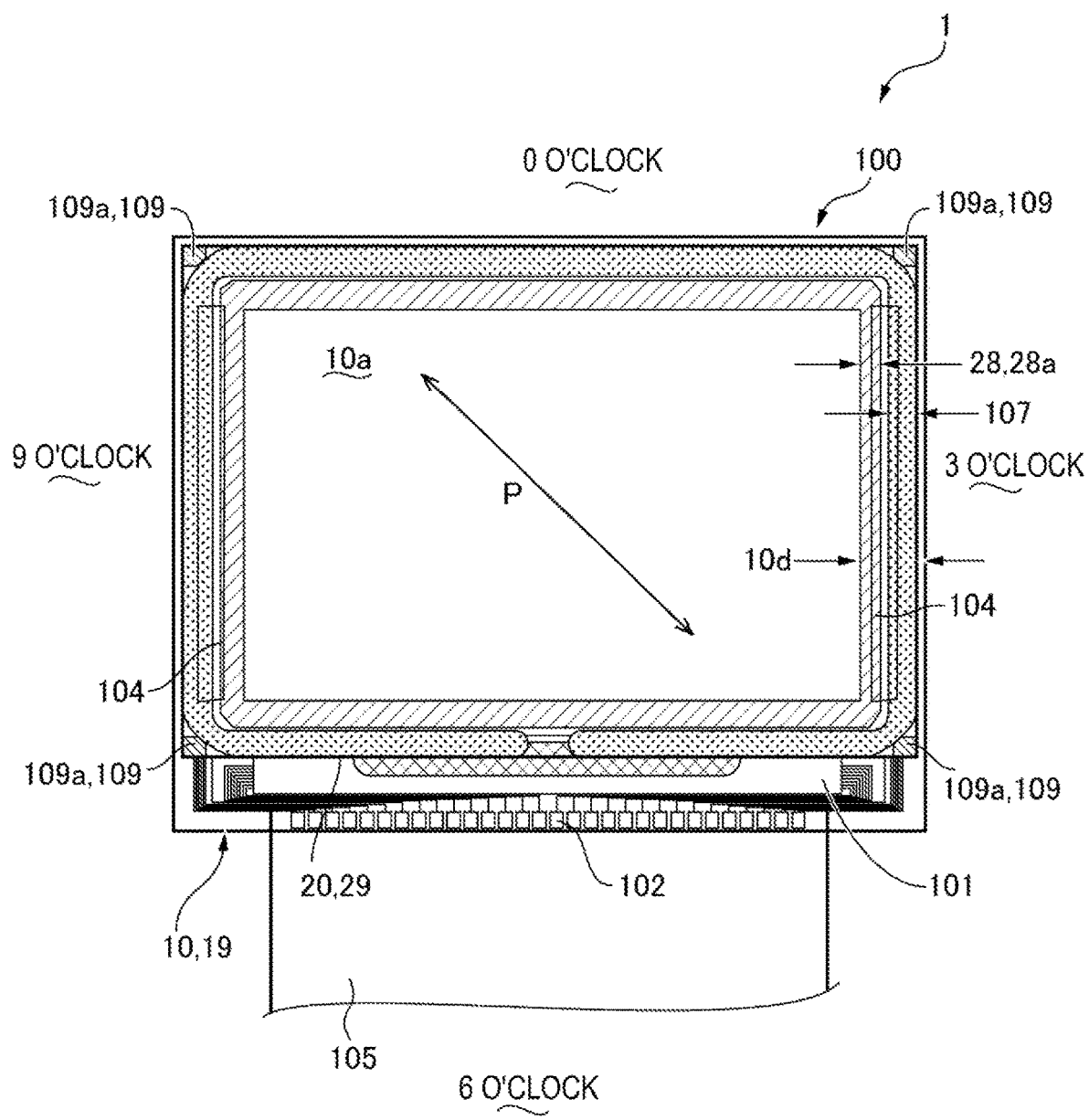
FIG. 2 is a plan view of a liquid crystal panel used for the liquid crystal device according to Exemplary Embodiment 1 of the present disclosure.
Figure 3:
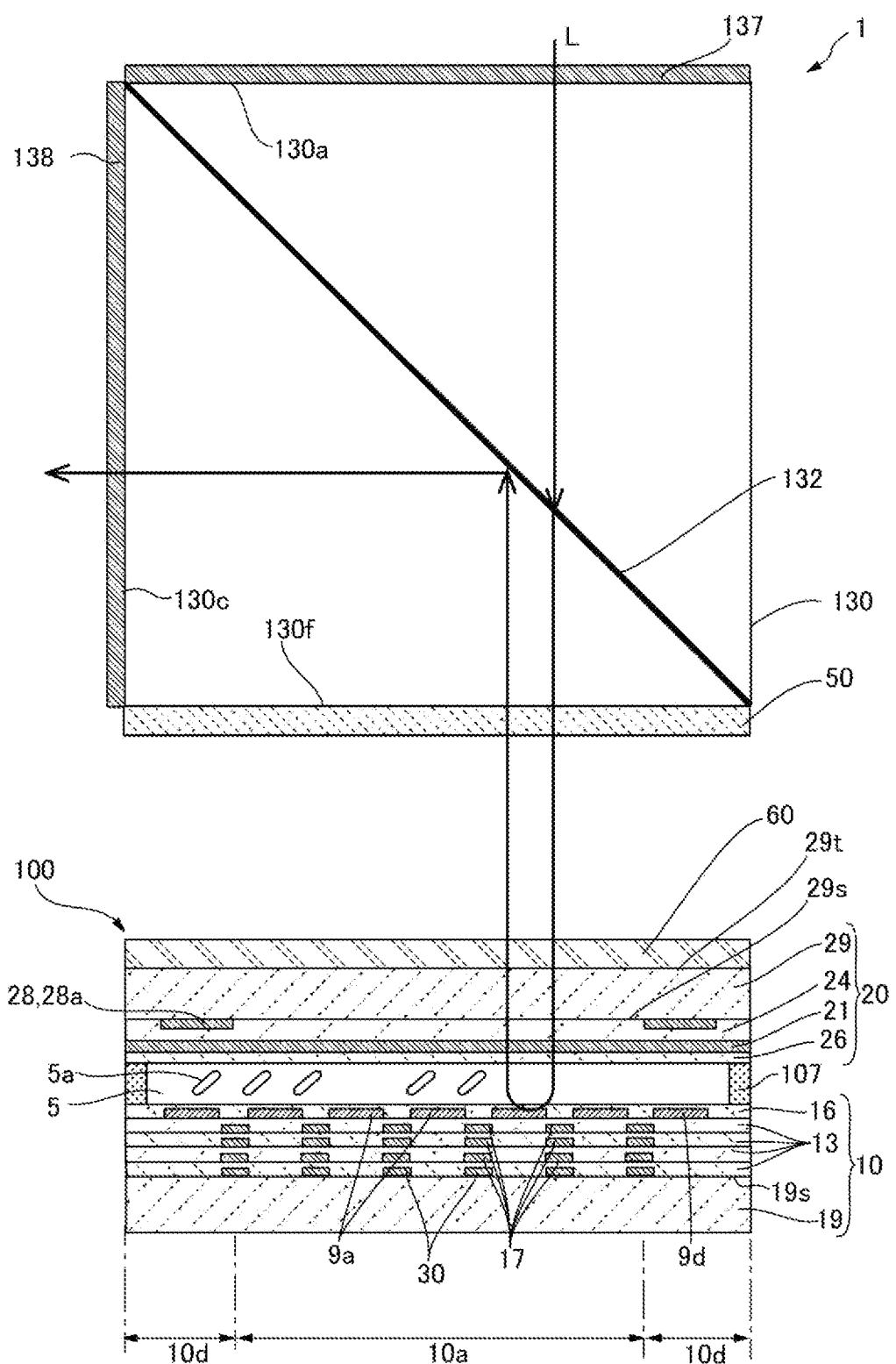
FIG. 3 is an explanatory diagram illustrating a configuration of the liquid crystal device illustrated in FIG. 1.

FIG. 2 is a plan view illustrating the liquid crystal device 100 used for the liquid crystal device 1 according to Exemplary Embodiment 1 of the present disclosure. FIG. 2 illustrates a state where the liquid crystal device 100 is viewed from a second substrate 20 side. FIG. 3 is an explanatory diagram illustrating a configuration of the liquid crystal device 1 illustrated in FIG. 2, and schematically illustrates a cross section of the liquid crystal device 1. Since basic configurations of the liquid crystal devices 1r, 1b, and 1g illustrated in FIG. 1 are the same, the reference numerals r, g, and b indicating the corresponding colors are omitted from each element, in the following description.

The liquid crystal device 1 includes a reflection-type liquid crystal panel 100 illustrated in FIG. 2. As illustrated in FIG. 3, in the liquid crystal panel 100, the first substrate 10 including a reflection layer 9a and the second substrate 20 having light-transmissivity face each other with a liquid crystal layer 5 interposed therebetween. In such a liquid crystal panel 100, while light incident from the second substrate 20 side is reflected on the reflection layer 9a of the first substrate 10 and is again emitted from the second substrate 20 side, the light is modulated and an image is displayed.

The liquid crystal device 1 of the present embodiment includes the first polarizing plate 137 and the second polarizing plate 138 arranged in an optical path L in which the light incident on the second substrate 20 side is reflected on the reflection layer 9a and is emitted from the second substrate 20 side. In such an optical path, both an incident optical path incident from the second substrate 20 side and toward the reflection layer 9a and an emission optical path reflected by the reflection layer 9a and emitted from the second substrate 20 side extend along a normal line direction with respect to the second substrate 20.

The liquid crystal device 1 includes a polarized light separating element 130 that synthesizes the incident optical path from the first polarizing plate 137 toward the reflection layer 9a and an optical path from the reflection layer 9a toward the second polarizing plate 138. Further, the liquid crystal device 1 includes a λ/4 phase difference plate 50 arranged in a common optical path in which the incident optical path and the emission optical path overlap each other, and a phase difference compensation layer 60 arranged between the λ/4 phase difference plate 50 and the reflection layer 9a.

When viewed from a direction along the optical path L, the first polarizing plate 137 and the second polarizing plate 138 are arranged in crossed-Nicols state in which optical axes of each other form an angle of 90°. Accordingly, the first polarizing plate 137 transmits p-polarized light, and reflects or absorbs s-polarized light. The second polarizing plate 138 transmits s-polarized light, and reflects or absorbs p-polarized light. The polarized light separating element 130 transmits p-polarized light and reflects s-polarized light.

In the present embodiment, the polarized light separating element 130 is a cubic-shaped polarized light separating prism, and the polarized light separating element 130 has a first end surface 130a, a second end surface 130f that faces parallel to the first end surface 130a, and a third end surface 130c orthogonal to the first end surface 130a and the second end surface 130f between the first end surface 130a and the second end surface 130f. In the present embodiment, the first polarizing plate 137 is arranged so as to overlap the first end surface 130a, the second polarizing plate 138 is arranged so as to overlap the third end surface 130c, and the third end surface 130c is an opposing surface that faces the second substrate 20. The polarized light separating element 130 includes a polarized light separating membrane 132 that forms an angle of 45° with respect to the first end surface 130a, the second end surface 130f, and the third end surface 130c, inside the polarized light separating element 130.

In the present embodiment, the λ/4 phase difference plate 50 is formed of an inorganic film that is diagonally vapor-deposited on the second end surface 130f of the polarized light separating element 130. Therefore, the lifetime of λ/4 phase difference plate 50 can be prolonged, and thus the lifetime of the liquid crystal device 1 can be prolonged. Further, the λ/4 phase difference plate 50 is formed from a thin film having a film thickness of several tens nm to several hundreds nm. Therefore, since a true zero-order design that can obtain a predetermined retardation at zero-order is possible, an appropriate phase difference is exhibited even when light having various polar angles is incident thereon.

The liquid crystal panel 100 is arranged such that an orientation direction P of liquid crystal molecules 5a, which is described later, forms an angle of 45° with respect to the optical axis of the first polarizing plate 137 and the optical axis of the second polarizing plate 138. The angle formed by the optical axes of the first polarizing plate 137 and the second polarizing plate 138 is not limited to 90°, and may be within a range of 90°±5° in consideration of manufacturing tolerances and the like. Further, the angle formed by the optical axes of the first polarizing plate 137 and the second polarizing plate 138, and the orientation direction P is not limited to 45°, and the angle may be within the range of 45°±5° in consideration of manufacturing tolerances and the like.

In the present embodiment, the phase difference compensation layer 60 is provided integrally with the liquid crystal panel 100, as described later.

3. Detailed Configuration of Liquid Crystal Panel 100

As illustrated in FIGS. 2 and 3, in the liquid crystal panel 100, the first substrate 10 and the second substrate 20 are applied to each other by a sealing material 107 with a predetermined gap interposed therebetween. The sealing material 107 is provided along an outer edge of the second substrate 20 to have a frame shape, and the liquid crystal layer 5 is arranged in a region surrounded by the sealing material 107 between the first substrate 10 and the second substrate 20. Both the first substrate 10 and the second substrate 20 have a quadrangle shape. In a substantially central portion of the liquid crystal panel 100, a display region 10a is provided as a rectangular region having a longer dimension in the direction from 3 o'clock toward 9 o'clock and a shorter dimension in the direction from 0 o'clock toward 6 o'clock, and the display region 10a is surrounded by a peripheral region 10d.

A substrate body 19 of the first substrate 10 is made of a light-transmitting substrate such as quartz and glass. The substrate body 19 may also be made of a silicon substrate. In the liquid crystal panel 100, a region from the substrate body 19 to a first oriented film 16 corresponds to the first substrate 10. On one surface 19s side of the substrate body 19 on the second substrate 20 side, on an outer side of the display region 10a, a data line driving circuit 101 and a plurality of terminals 102 are formed along one side of the first substrate 10. A scan line driving circuit 104 is formed along other sides adjacent to the one side. A flexible wiring substrate 105 is coupled to the terminal 102, and various potentials and various signals are input to the first substrate 10 via the flexible wiring substrate 105.

On the one surface 19s side of the substrate body 19, a plurality of the reflection layers 9a made of a reflective metal such as aluminum are arranged in a matrix as pixel electrodes in the display region 10a, and a pixel switching element 30 is electrically coupled to each of the plurality of the reflection layers 9a. In the first substrate 10, the first oriented film 16 is formed at the second substrate 20 side with respect to the reflection layers 9a, and the reflection layers 9a are covered with the first oriented film 16. Accordingly, the region from the substrate body 19 to the first oriented film 16 corresponds to the first substrate 10. In the first substrate 10, a plurality of insulating films 13 are formed between the substrate body 19 and the reflection layer 9a, and the pixel switching element 30 is formed between the substrate body 19 and the insulating film 13. Further, a wiring 17 such as a data line, a scan line, and the like is formed between the layers of the plurality of insulating films 13. When the substrate body 19 is made of a silicon substrate, the pixel switching element 30 uses the substrate body 19 as a semiconductor layer.

A substrate body 29 of the second substrate 20 is made of a light-transmitting substrate such as quartz or glass that does not have refractive index anisotropy, and a region from substrate body 29 to a second oriented film 26 corresponds to the second substrate 20. A common electrode 21 as a light-transmitting electrode made of an ITO film is formed at one surface 29s side of the second substrate 20 located at the first substrate 10 side, and the second oriented film 26 is formed at the first substrate 10 side with respect to the common electrode 21. The common electrode 21 is formed substantially entirely at the second substrate 20. Opposite to the first substrate 10 with respect to the common electrode 21, a light-shielding film 28 having light-shielding properties and made of metal, a metal compound, and the like, and a protection film 24 which is light-transmissive are formed. The light shielding film 28 is formed, for example, as a partition 28a in a frame-like shape extending along the outer peripheral edge of the display region 10a. The light shielding film 28 may be formed as a black matrix in a region overlapping in plan view with a region located between reflection layers 9a adjacent to each other. In the present embodiment, in regions of the peripheral region 10d of the first substrate 10, which overlap with the partition 28a in plan view, dummy pixel electrodes 9d formed simultaneously with the reflection layers 9a are formed.

The first substrate 10 includes an inter-substrate conduction electrode 109 being formed in a region positioning outside the sealing material 107 and overlapping with a corner portion of the second substrate 20 such that electrical conduction is established between the first substrate 10 and the second substrate 20. An inter-substrate conduction material 109a including conductive particles is disposed in the inter-substrate conduction electrode 109. The common electrode 21 of the second substrate 20 is electrically coupled to the first substrate 10 side via the inter-substrate conduction material 109a and the inter-substrate conduction electrode 109. Therefore, a common potential is applied to the common electrode 21 from the first substrate 10 side.

4. Configuration of Liquid Crystal Layer 5 and the Like

Figure 4:
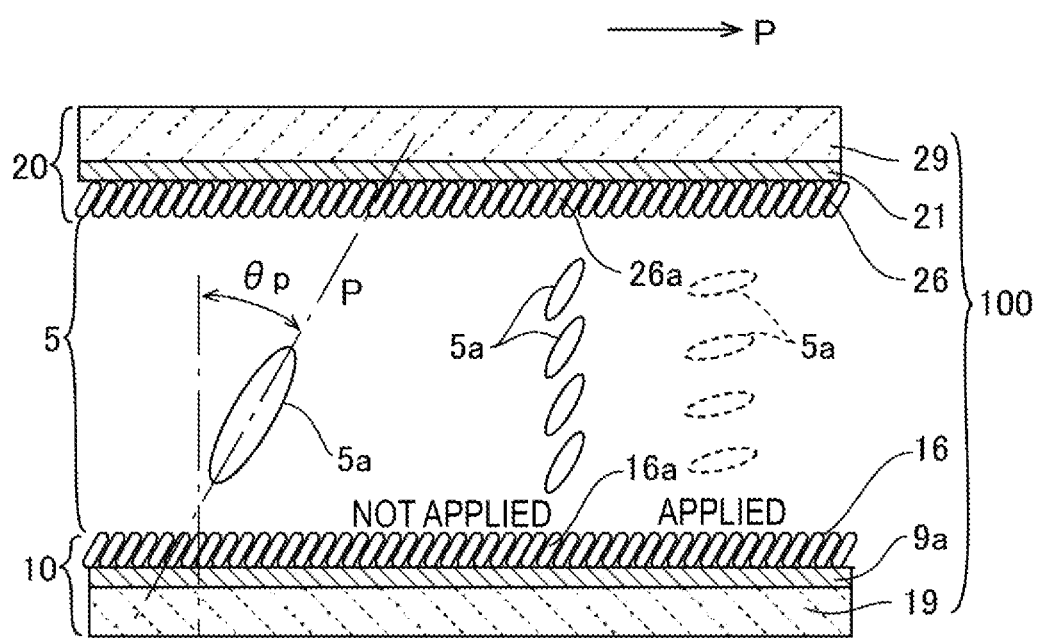
FIG. 4 is an explanatory diagram illustrating liquid crystal molecules and the like illustrated in FIG. 3.

FIG. 4 is an explanatory diagram of the liquid crystal molecules 5a illustrated in FIG. 3 and the like. In FIG. 4, the first oriented film 16 and the second oriented film 26 are inorganic oriented films formed of diagonally vapor-deposited films of $SiO_x$ ($x \leq 2$), $SiO_2$, $TiO_2$, MgO, or $Al_2O_3$. Accordingly, the first alignment film 16 and the second alignment film 26 each include a columnar structure layer in which respective columnar bodies 16a or 26a each named a column are obliquely formed with respect to both the first substrate 10 and the second substrate 20. Thus, in the first oriented film 16 and the second oriented film 26, the liquid crystal molecules 5a having negative dielectric anisotropy and used in the liquid crystal layer 5 are oriented diagonally with respect to the first substrate 10 and the second substrate 20 to allow the liquid crystal molecules 5a to be pre-tilted.

Herein, a pre-tilt angle θp refers to an angle defined between a direction orthogonal to the first substrate 10 and the second substrate 20 and a major axis (orientation direction) of the liquid crystal molecules 5a in a state where no voltage is applied between the reflection films 9a and the common electrode 21. In the present embodiment, the pre-tilt angle θp is 5°, for example.

In this way, the liquid crystal device 1 is configured as a liquid crystal device of a Vertical Alignment (VA) mode. In the liquid crystal device 1 thus configured, upon a voltage applied between the reflection film 9a and the common electrode 21, the liquid crystal molecules 5a are displaced to minimize the tilt angle with respect to the first substrate 10 and the second substrate 20, as illustrated by dotted lines. The direction of such a displacement corresponds to so-called a clear vision direction. In the present embodiment, as illustrated in FIG. 1, the orientation direction P (clear view direction) of the liquid crystal molecules 5a is a direction in a plan view from 04:30 toward 10:30 on a clock.

5. Configuration of Phase Difference Compensation Layer 60

In the liquid crystal device 1 of the present embodiment, the phase difference compensation layer 60 formed of a C plate, an O plate, or an A plate is integrally provided with the liquid crystal panel 100. The phase difference compensation layer 60 is defined as follows with respect to the refractive index ellipsoid (three-dimensional distribution of the refractive index).

The coordinate axes in the substrate plane of the first substrate 10 or the second substrate 20 are defined as XY axes, and the normal line direction thereof is defined as Z-axis. Main refractive index in an X-axis direction is referred to as Nx, main refractive index in a Y-axis direction is referred to as Ny, and main refractive index in a Z-axis direction is referred to as Nz.

The A plate (positive A plate) satisfies the following conditional equation.

Nx>Ny=Nz

The C plate (negative C plate) satisfies the following conditional equation.

Nx=Ny>Nz

In the O plate, the refractive index ellipsoid itself is tilted with respect to the substrate. For example, the refractive index ellipsoid tilts at a certain angle from the substrate normal line with the Y-axis as a rotation axis with respect to Nx>Ny>Nz, and when viewed from substrate normal line, the phase-delaying axis in the ellipsoidal cross section by the XY plane is in the Y-axis direction. However, the condition is not limited to the above, and the Y-axis direction may be a phase-advancing axis depending on the ellipsoidal shape and its inclination.

In the present embodiment, the liquid crystal panel 100 is provided with the phase difference compensation layer 60 formed of, for example, a C plate having negative refractive index anisotropy. In the present embodiment, the phase difference compensation layer 60 is provided on a surface 29t of the substrate body 29 on the opposite side to the liquid crystal layer 5 in the second substrate 20. The phase difference compensation layer 60 is made of an inorganic material. For example, the phase difference compensation layer 60 is formed by alternately sputtering about 20 layers of a high refractive index layer and a low refractive index layer. The high refractive index layer is formed from, for example, niobium oxide having a refractive index of 2.3, and the thickness of one layer is 20 nm. The low refractive index layer is formed from, for example, silicon oxide having a refractive index of 1.5, and the thickness of one layer is 20 nm.

The phase difference compensation layer 60 thus configured has an optical axis that is directed to the normal line to the first substrate 10 and the second substrate 20, and is optically isotropic in the substrate plane, but is optically anisotropic in a plane vertical to the substrate plane. Therefore, the phase difference of the light incident on the liquid crystal layer 5 from an oblique direction can be compensated by the phase difference compensation layer 60, so that the contrast and the visual field angle characteristic can be improved.

6. Action and Main Effect of the Embodiment

In the liquid crystal device 1 thus configured, since the light source light incident on the liquid crystal device 1 is linearly polarized light of P-polarization, after passing through the first polarizing plate 137 and the polarized light separating membrane 132, the light source light is converted to circularly polarized light or elliptically polarized light by the λ/4 phase difference plate 50 and then incident on the liquid crystal panel 100. The liquid crystal layer 5 is in a state in which the liquid crystal molecules 5a are oriented substantially perpendicular to the first substrate 10 and the second substrate 20 when no voltage is applied, and the optical anisotropy is significantly small when the liquid crystal layer 5 is viewed from the front. Thus, when no voltage is supplied, the circularly polarized light or the elliptically polarized light incident on the liquid crystal layer 5 passes through the liquid crystal layer 5 while substantially remaining the polarized state, and then is reflected by the reflection layer 9a and emitted from the second substrate 20. Then, by passing through the λ/4 phase difference plate 50 again, the circularly polarized or the elliptically polarized light becomes linearly polarized light of P-polarization, and then passes through the polarized light separating element 130. Accordingly, black display is achieved.

Next, when a voltage is applied to the liquid crystal layer 5, in the pixel to which the voltage is applied, the liquid crystal molecules 5a fall in the pre-tilted direction, and the circularly polarized or elliptically polarized light incident on the liquid crystal layer 5 is modulated. By passing through the λ/4 phase difference plate 50 again, the modulated light becomes s-polarized light, and after reflected by the polarized light separating membrane 132, passes through the second polarizing plate 138. Accordingly, white display is achieved.

In the liquid crystal device 1 thus configured, light converted into circularly polarized light or elliptically polarized light by the λ/4 phase difference plate 50 is incident on the liquid crystal panel 100. Here, the liquid crystal molecules 5a fall in the pre-tilted direction, but some of the liquid crystal molecules 5a may be tilted in different directions or angles due to an influence of the liquid crystal molecules 5a of adjacent pixels, and the like. Even in such a case, the incident light as the circularly polarized light or elliptically polarized light is less affected by the orientation of the liquid crystal molecules 5a than linearly polarized light, and therefore is less affected by the disclination. Therefore, according to the liquid crystal device 1 of the present embodiment, a domain due to the disclination is less likely to occur than in a case where the linearly polarized light is incident on the liquid crystal panel 100. Accordingly, even when trying to narrow the pitch of the pixels or the like, or when the axis of the image light emitted from the liquid crystal device 1 is shifted in the uniaxial direction or the biaxial direction in the projection-type display device described later to increase the resolution, high-definition images can be displayed.

Further, since the liquid crystal device 1 is provided with the phase difference compensation layer 60 made of a C plate, the contrast and the visual field angle characteristics can be improved. Further, the phase difference compensation layer 60 is integrally provided with the liquid crystal panel 100. Therefore, it is not necessary to independently provide the phase difference compensation layer 60 between the liquid crystal panel 100 and the λ/4 phase difference plate 50, so that the configuration can be simplified. Moreover, the λ/4 phase difference plate 50 is integrally provided with the polarized light separating element 130. Therefore, the λ/4 phase difference plate 50 need not be provided independently, so that the configuration can be simplified. Therefore, when manufacturing an electronic device such as the projection-type display device 1000, restrictions of the space around the liquid crystal panel 100 and the labor required for aligning the optical members are small.

Modified Example 1 of Exemplary Embodiment 1

Figure 5:
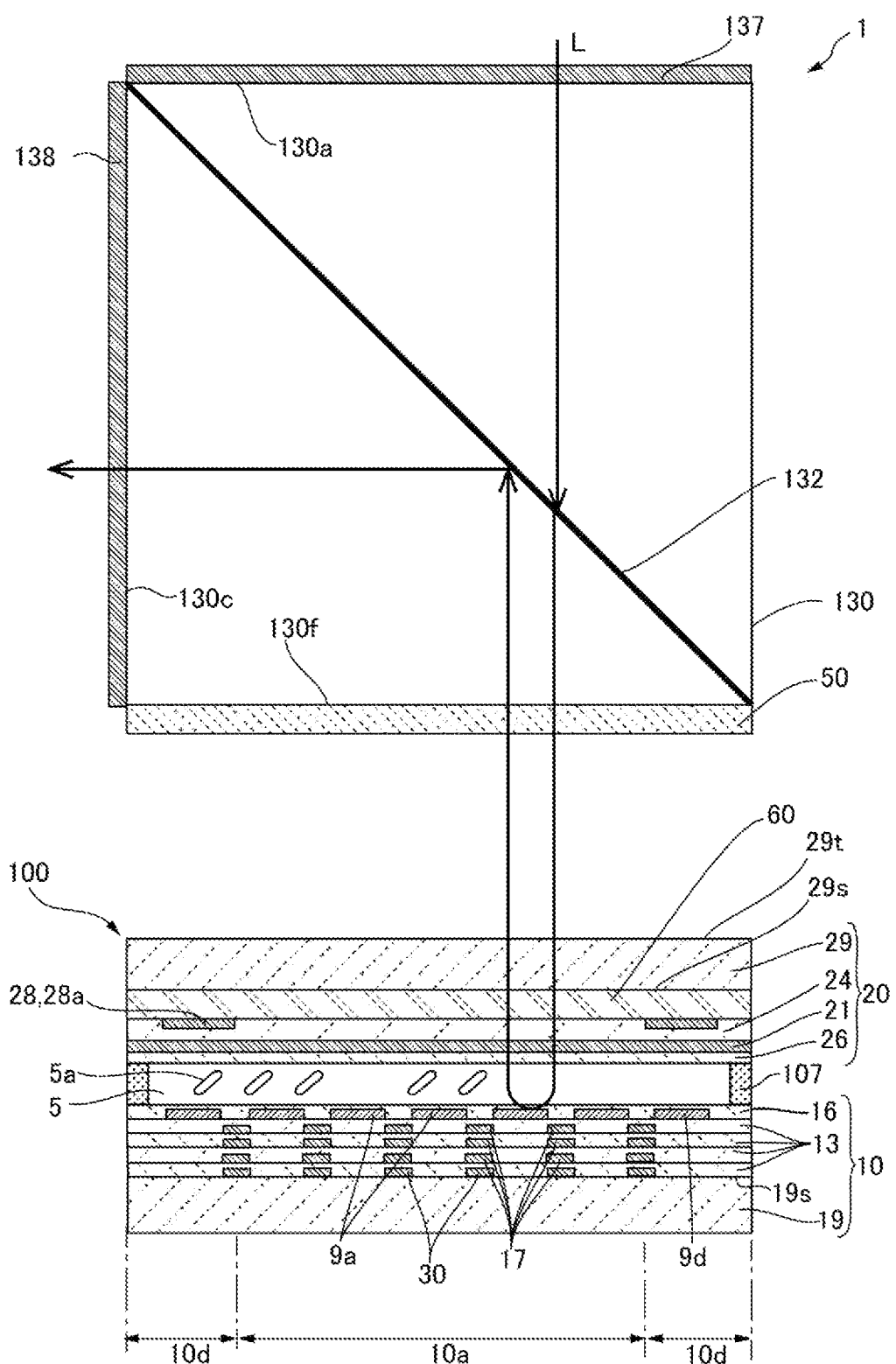
FIG. 5 is an explanatory diagram of a liquid crystal device according to Modified Example 1 of Exemplary Embodiment 1 of the present disclosure.

FIG. 5 is an explanatory diagram of a liquid crystal device 1 according to Modified Example 1 of Exemplary Embodiment 1 of the present disclosure. Note that the basic configuration of this exemplary embodiment and exemplary embodiments to be described later is the same as the configuration of Exemplary Embodiment 1, and thus a description of common portions will be omitted. As illustrated in FIG. 5, in the present embodiment, the λ/4 phase difference plate 50 is formed of an inorganic film that is diagonally vapor-deposited on the second end surface 130f of polarized light separating element 130, as well as Exemplary Embodiment 1.

Further, the phase difference compensation layer 60 is integrally provided with the liquid crystal panel 100. In the present embodiment, the phase difference compensation layer 60 formed of a C plate is made of a multilayer film of an inorganic material layered on the one surface 29s of the substrate body 29 on the liquid crystal layer 5 side of in the second substrate 20, and is provided between the substrate body 29 and the light shielding film 28. Accordingly, the phase difference compensation layer 60 is located between the substrate body 29 and the protective film 24 in a region where the light shielding film 28 is not provided. The rest of the configuration is the same as Exemplary Embodiment 1. In this aspect as well, since the phase difference compensation layer 60 is integrally provided with the liquid crystal panel 100, the same effect as that of Exemplary Embodiment 1 can be obtained, such as simplification of the configuration.

Modified Example 2 of Exemplary Embodiment 1

Figure 6:
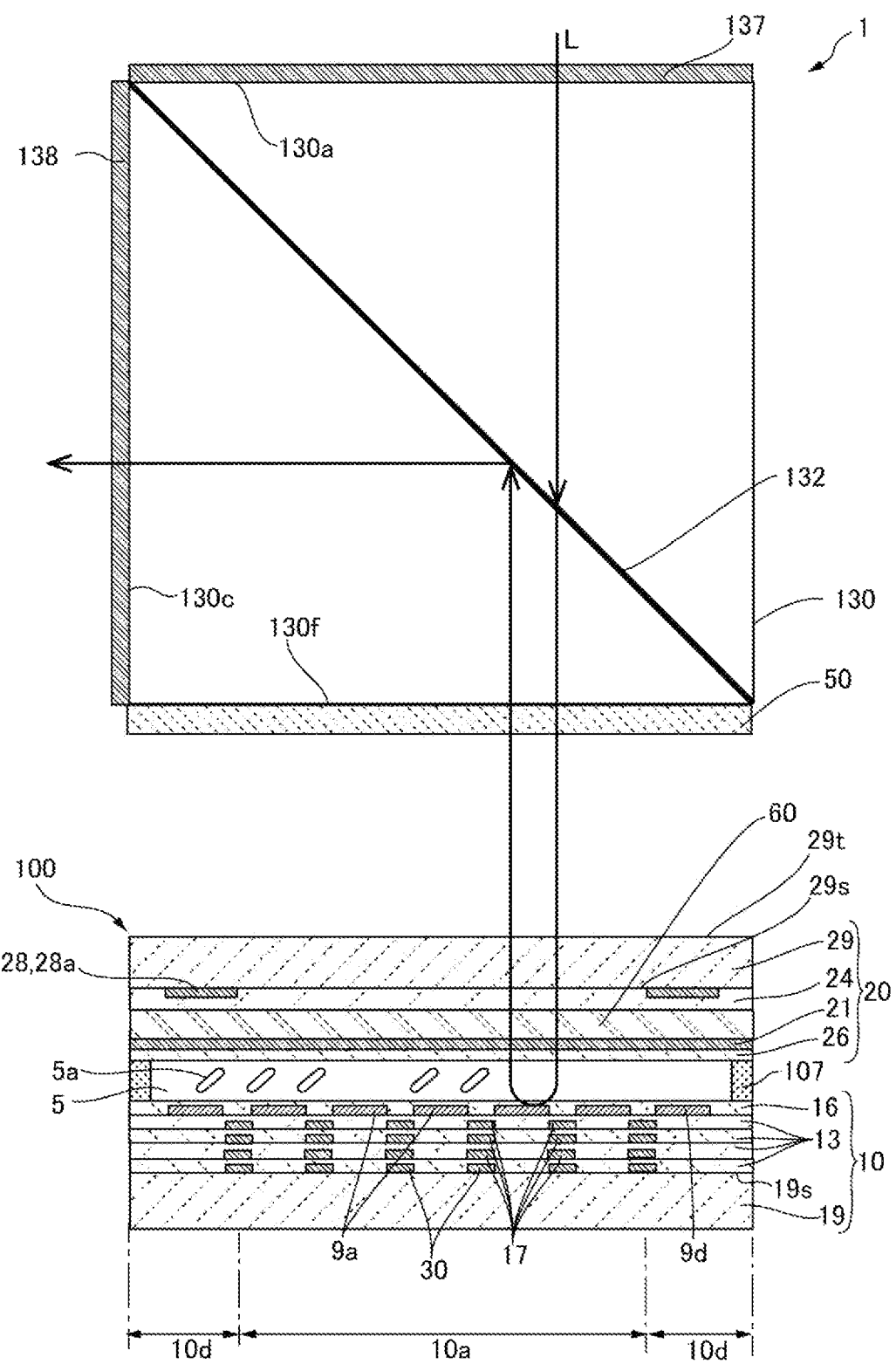
FIG. 6 is an explanatory diagram of a liquid crystal device according to Modified Example 2 of Exemplary Embodiment 1 of the present disclosure.

FIG. 6 is an explanatory diagram of a liquid crystal device 1 according to Modified Example 2 of Exemplary Embodiment 1 of the present disclosure. As illustrated in FIG. 6, in the present embodiment, the λ/4 phase difference plate 50 is formed of an inorganic film that is diagonally vapor-deposited on the second end surface 130f of polarized light separating element 130, as well as Exemplary Embodiment 1.

Further, the phase difference compensation layer 60 formed of the C plate is integrally provided with the liquid crystal panel 100. In the present embodiment, the phase difference compensation layer 60 is formed of a multilayer film of an inorganic material provided between the protective film 24 and the common electrode 21 in the second substrate 20. The rest of the configuration is the same as Exemplary Embodiment 1. In this aspect as well, since the phase difference compensation layer 60 is integrally provided with the liquid crystal panel 100, the same effect as that of Exemplary Embodiment 1 can be obtained, such as simplification of the configuration.

Modified Example 3 of Exemplary Embodiment 1

The configuration of the periphery of the phase difference compensation layers 60 employed in Exemplary Embodiment 1 and Modified Examples 1 and 2 thereof may be employed in a case where, for example, a light-transmitting substrate for dust prevention is bonded by an adhesive or the like to the surface 29t of the substrate body 29 of the second substrate 20 on the opposite side to the liquid crystal layer 5.

Second Exemplary Embodiment

Figure 7:
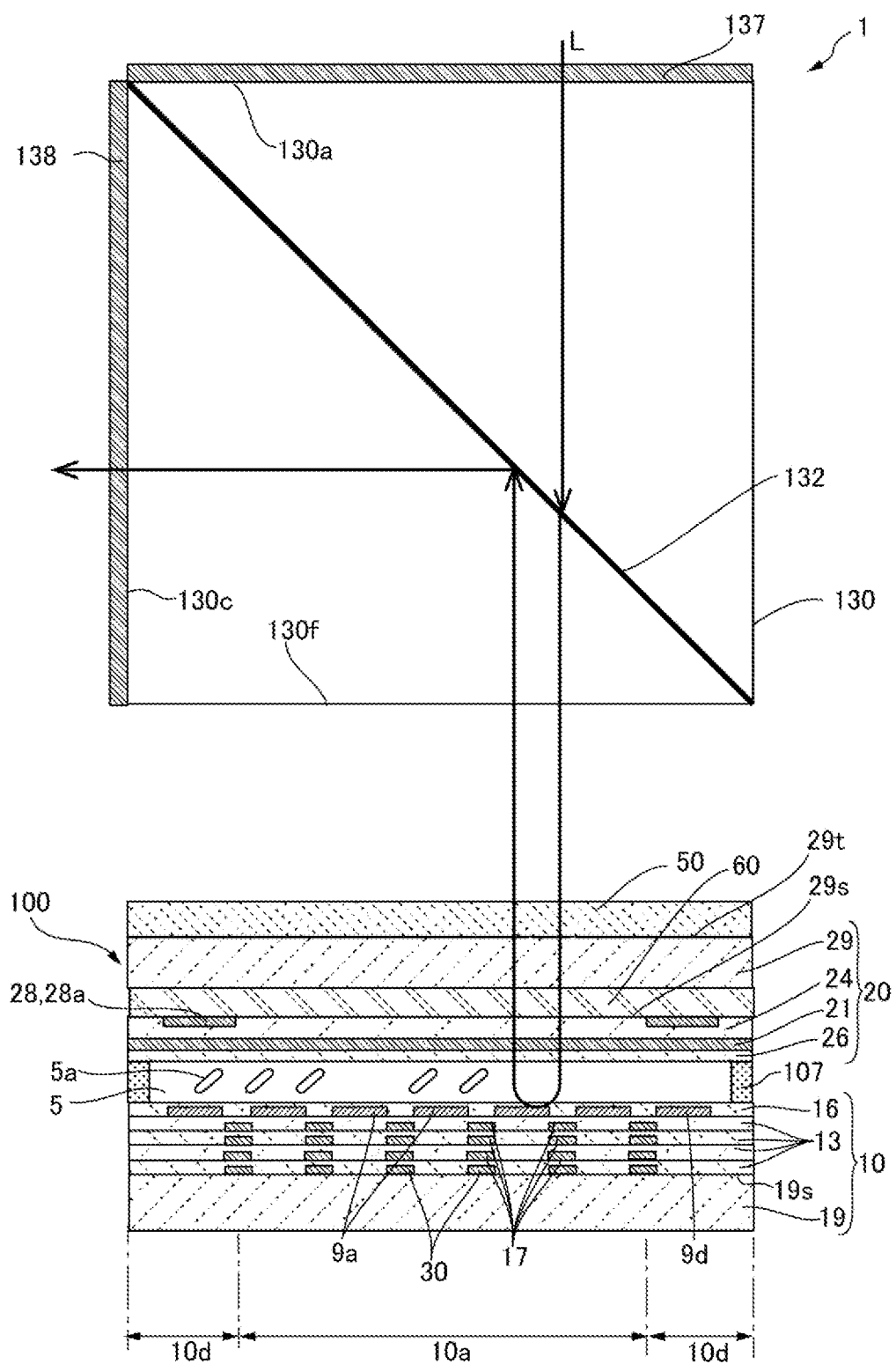
FIG. 7 is an explanatory diagram of a liquid crystal device according to Exemplary Embodiment 2 of the present disclosure.

FIG. 7 is an explanatory diagram of a liquid crystal device 1 according to Exemplary Embodiment 2 of the present disclosure. As illustrated in FIG. 7, in the present embodiment, the λ/4 phase difference plate 50 and the phase difference compensation layer 60 formed of the C plate are integrally provided with the liquid crystal panel 100. More specifically, the λ/4 phase difference plate 50 is formed of a multilayer film of an inorganic material layered on the surface 29t of the substrate body 29 on the opposite side to the liquid crystal layer 5 in the second substrate 20. The phase difference compensation layer 60 is formed of a multilayer film of an inorganic material layered on the one surface 29s of the substrate body 29 on the liquid crystal layer 5 side in the second substrate 20, and is provided between the substrate body 29 and the light shielding film 28. The rest of the configuration is the same as Exemplary Embodiment 1. In this aspect, since the λ/4 phase difference plate 50 and the phase difference compensation layer 60 are integrally provided with the liquid crystal panel 100, the same effect as that of Exemplary Embodiment 1 can be obtained, such as simplification of the configuration.

Modified Example of Exemplary Embodiment 2

Figure 8:
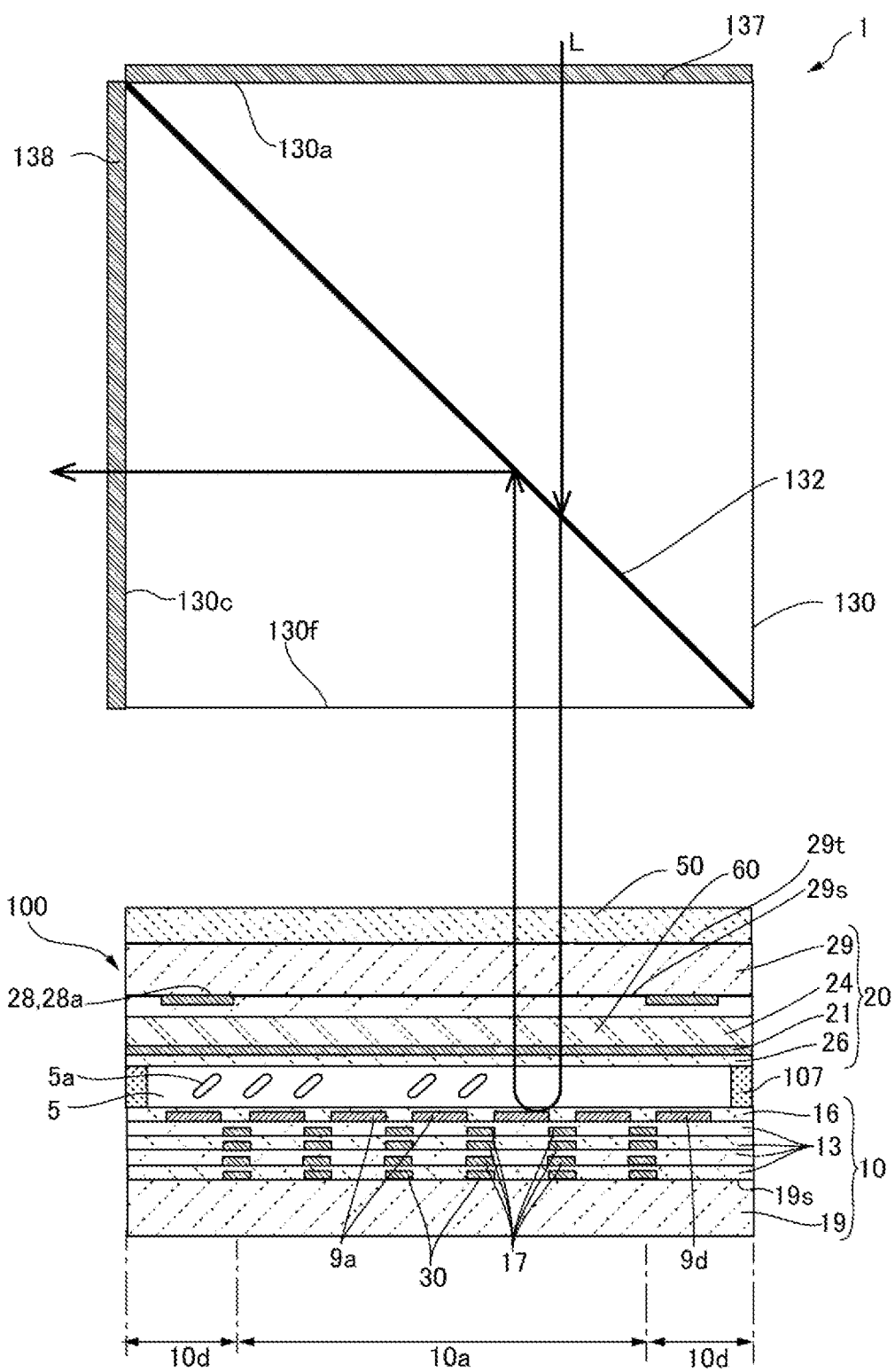
FIG. 8 is an explanatory diagram of a liquid crystal device according to a Modified Example of Exemplary Embodiment 2 of the present disclosure.

FIG. 8 is an explanatory diagram of a liquid crystal device 1 according to a Modified Example of Exemplary Embodiment 2 of the present disclosure. As illustrated in FIG. 8, in the present embodiment, the λ/4 phase difference plate 50 and the phase difference compensation layer 60 formed of the C plate are integrally provided with the liquid crystal panel 100, as well as Exemplary Embodiment 2. More specifically, the λ/4 phase difference plate 50 is formed of a multilayer film of an inorganic material layered on the surface 29t of the substrate body 29 opposite to the liquid crystal layer 5 in the second substrate 20. The phase difference compensation layer 60 is formed of a multilayer film of an inorganic material provided between the protective film 24 and the common electrode 21 in the second substrate 20. The rest of the configuration is the same as Exemplary Embodiment 1. In this aspect as well, since the λ/4 phase difference plate 50 and the phase difference compensation layer 60 are integrally provided with the liquid crystal panel 100, the same effect as that of Exemplary Embodiment 1 can be obtained, such as simplification of the configuration.

Embodiment 3

Figure 9:
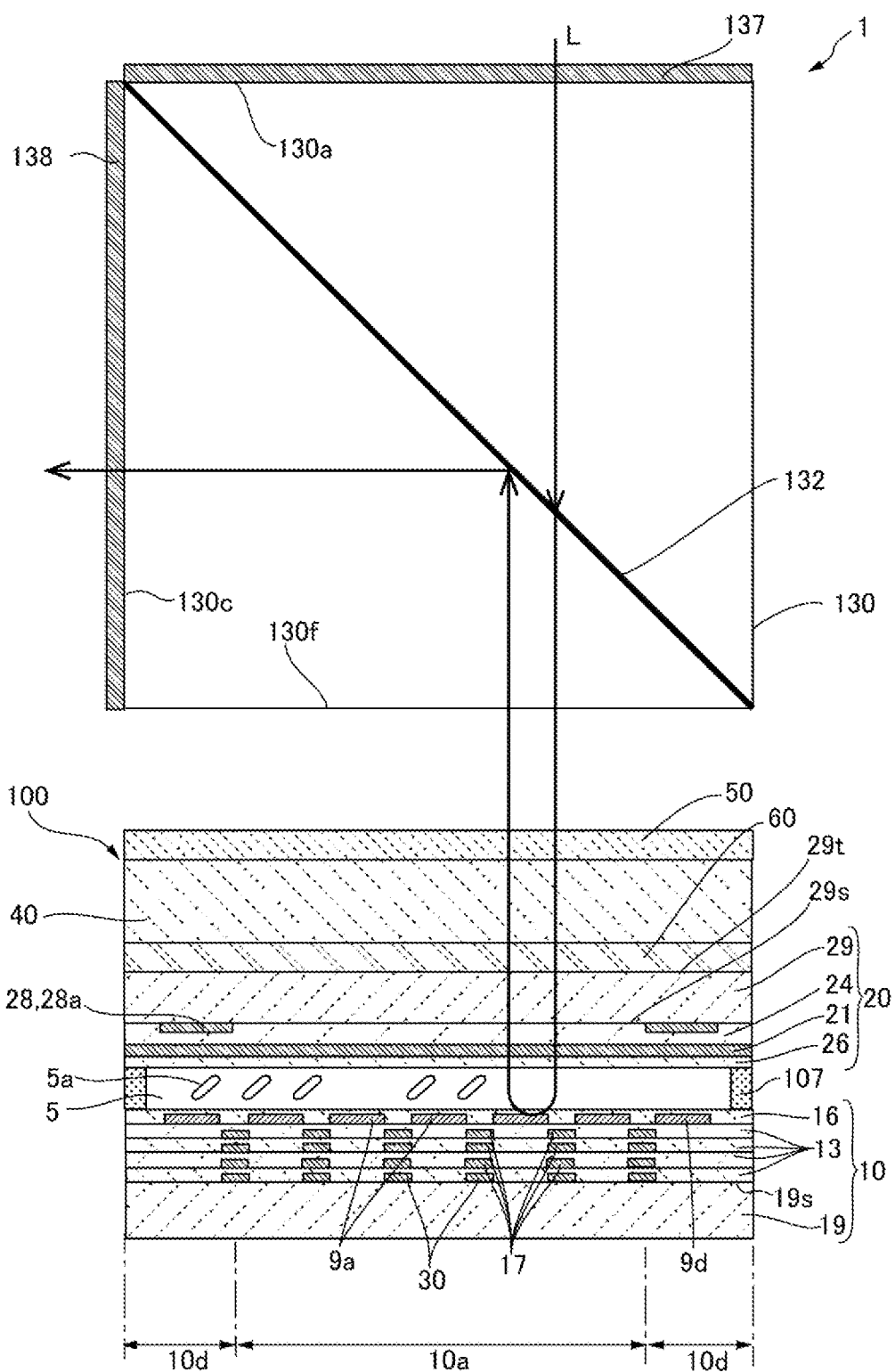
FIG. 9 is an explanatory diagram of a liquid crystal device according to Exemplary Embodiment 3 of the present disclosure.

FIG. 9 is an explanatory diagram of a liquid crystal device 1 according to Exemplary Embodiment 3 of the present disclosure. As illustrated in FIG. 9, in the liquid crystal panel 100, a light-transmitting substrate 40 for dust prevention is bonded by an adhesive or the like to the surface 29t of the substrate body 29 of the second substrate 20 on the opposite side to the liquid crystal layer 5. Here, the λ/4 phase difference plate 50 and the phase difference compensation layer 60 formed of the C plate are integrally provided with the liquid crystal panel 100. More specifically, the λ/4 phase difference plate 50 is formed of a multilayer film of an inorganic material layered on a surface of the light-transmitting substrate 40 on the opposite side to the liquid crystal layer 5. The phase difference compensation layer 60 is formed of a multilayer film of an inorganic material layered on the surface 29t of the substrate body 29 on the opposite side to the liquid crystal layer 5 in the second substrate 20. In other words, the phase difference compensation layer 60 is provided between the substrate body 29 and the light-transmitting substrate 40. The rest of the configuration is the same as Exemplary Embodiment 1. In this aspect, since the λ/4 phase difference plate 50 and the phase difference compensation layer 60 is integrally provided with the liquid crystal panel 100, the same effect as that of Exemplary Embodiment 1 can be obtained, such as simplification of the configuration. The phase difference compensation layer 60 may be formed of a multilayer film of an inorganic material layered on a surface of the light-transmitting substrate 40 on the liquid crystal layer 5 side.

Modified Example 1 of Exemplary Embodiment 3

Figure 10:
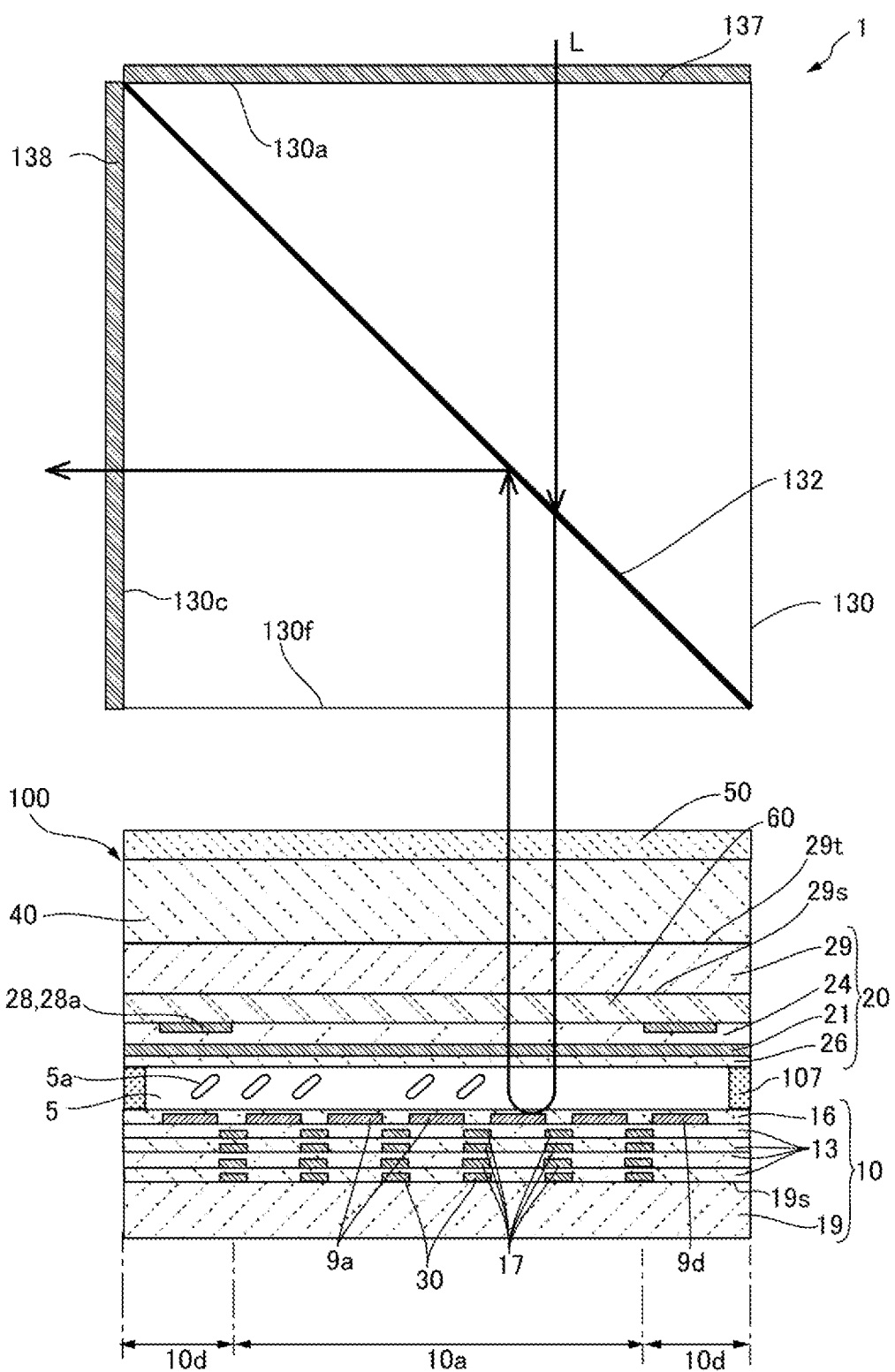
FIG. 10 is an explanatory diagram of a liquid crystal device according to Modified Example 1 of Exemplary Embodiment 3 of the present disclosure.

FIG. 10 is an explanatory diagram of a liquid crystal device 1 according to Modified Example 1 of Exemplary Embodiment 3 of the present disclosure. As illustrated in FIG. 10, in the present embodiment, the λ/4 phase difference plate 50 and the phase difference compensation layer 60 formed of the C plate are integrally provided with the liquid crystal panel 100, as well as Exemplary Embodiment 3. More specifically, the λ/4 phase difference plate 50 is formed of a multilayer film of an inorganic material layered on the surface of the light-transmitting substrate 40 on the opposite side to the liquid crystal layer 5. The phase difference compensation layer 60 is formed of a multilayer film of an inorganic material layered on the one surface 29t of the substrate body 29 on the liquid crystal layer 5 side in the second substrate 20. The rest of the configuration is the same as Exemplary Embodiment 1. In this aspect, since the λ/4 phase difference plate 50 and the phase difference compensation layer 60 is integrally provided with the liquid crystal panel 100, the same effect as that of Exemplary Embodiment 1 can be obtained, such as simplification of the configuration.

Modified Example 2 of Exemplary Embodiment 3

Figure 11:
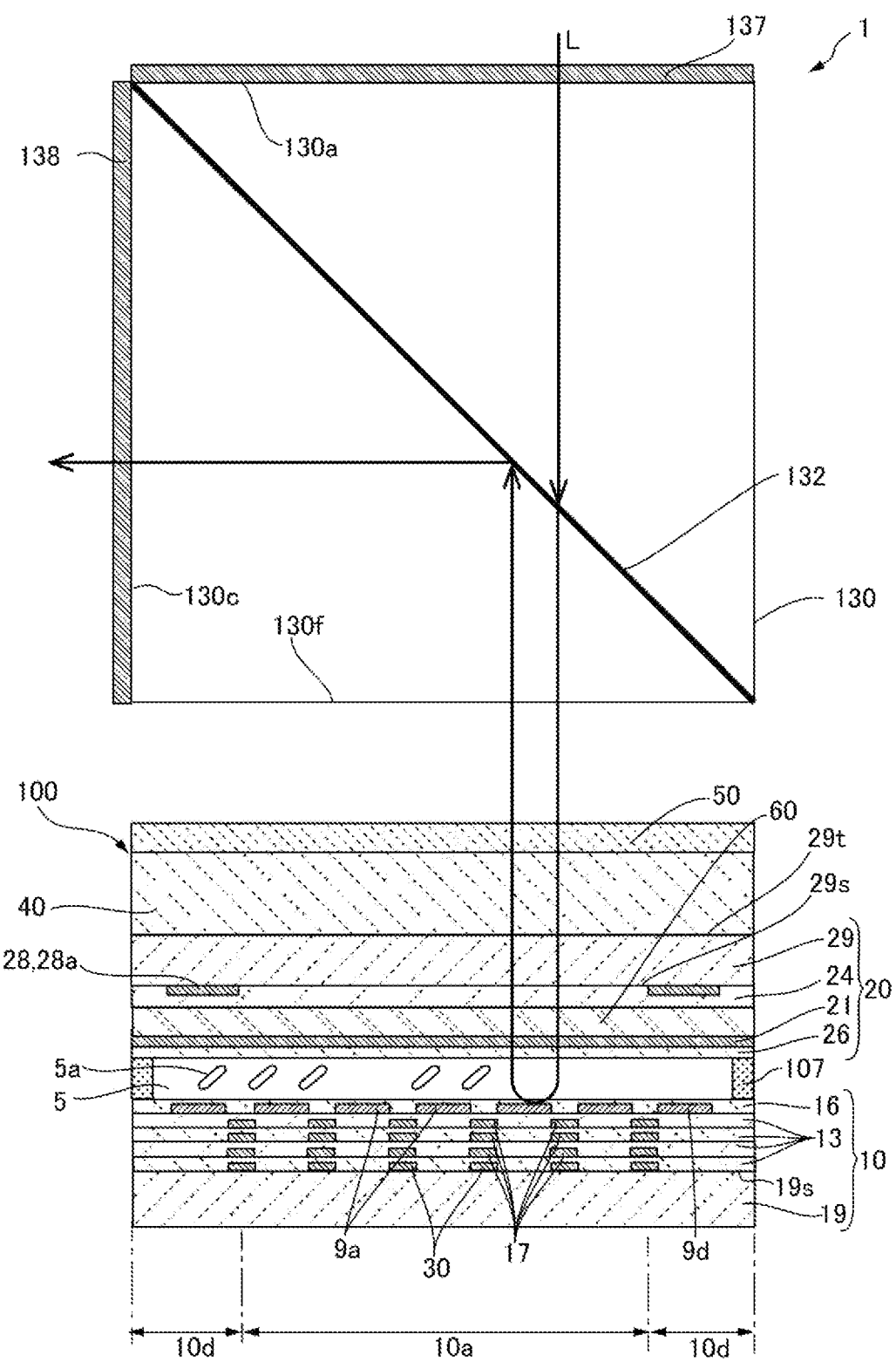
FIG. 11 is an explanatory diagram of a liquid crystal device according to Modified Example 2 of Exemplary Embodiment 3 of the present disclosure.

FIG. 11 is an explanatory diagram of a liquid crystal device 1 according to Modified Example 2 of Exemplary Embodiment 3 of the present disclosure. As illustrated in FIG. 11, in the present embodiment, the λ/4 phase difference plate 50 and the phase difference compensation layer 60 formed of the C plate are integrally provided with the liquid crystal panel 100, as well as Exemplary Embodiment 3. More specifically, the λ/4 phase difference plate 50 is formed of a multilayer film of an inorganic material layered on the surface of the light-transmitting substrate 40 on the opposite side to the liquid crystal layer 5. The phase difference compensation layer 60 is formed of a multilayer film of inorganic material provided between the protective film 24 and the common electrode 21 in the second substrate 20. The rest of the configuration is the same as Exemplary Embodiment 1. In this aspect as well, since the λ/4 phase difference plate 50 and the phase difference compensation layer 60 are integrally provided with the liquid crystal panel 100, the same effect as that of Exemplary Embodiment 1 can be obtained, such as simplification of the configuration.

Embodiment 4

Figure 12:
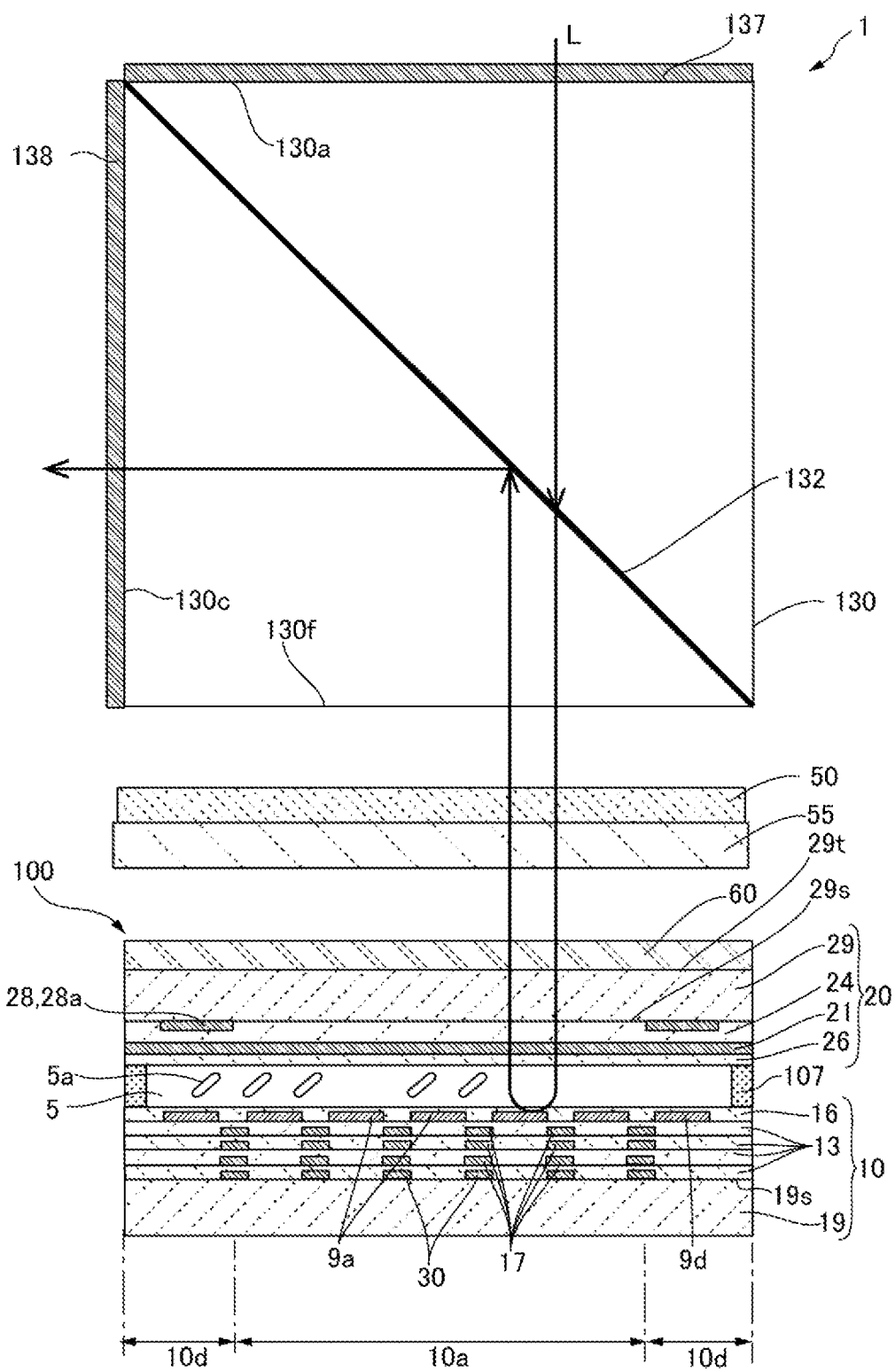
FIG. 12 is an explanatory diagram of a liquid crystal device according to Exemplary Embodiment 4 of the present disclosure.

FIG. 12 is an explanatory diagram of a liquid crystal device 1 according to Exemplary Embodiment 4 of the present disclosure. As illustrated in FIG. 12, in the present embodiment, the λ/4 phase difference plate 50 is formed of a multilayer film of an inorganic material layered on one surface of a light-transmitting substrate 55 arranged between the liquid crystal panel 100 and the polarized light separating element 130, and is separated from both the liquid crystal panel 100 and the polarized light separating element 130. The light-transmitting substrate 55 is a transmissive substrate that does not have refractive index anisotropy such as quartz. The phase difference compensation layer 60 formed of the C plate is formed of a multilayer film of an inorganic material layered on the surface 29t of the substrate body 29 on the opposite side to the liquid crystal layer 5 in the second substrate 20. The rest of the configuration is the same as Exemplary Embodiment 1. In this aspect, since the phase difference compensation layer 60 is integrally provided with the liquid crystal panel 100, the same effect as that of Exemplary Embodiment 1 can be obtained, such as simplification of the configuration.

The phase difference compensation layer 60 may be formed of a multilayer film of an inorganic material layered on a surface of the light-transmitting substrate 55 on the liquid crystal layer 5 side.

Modified Example 1 of Exemplary Embodiment 4

Figure 13:
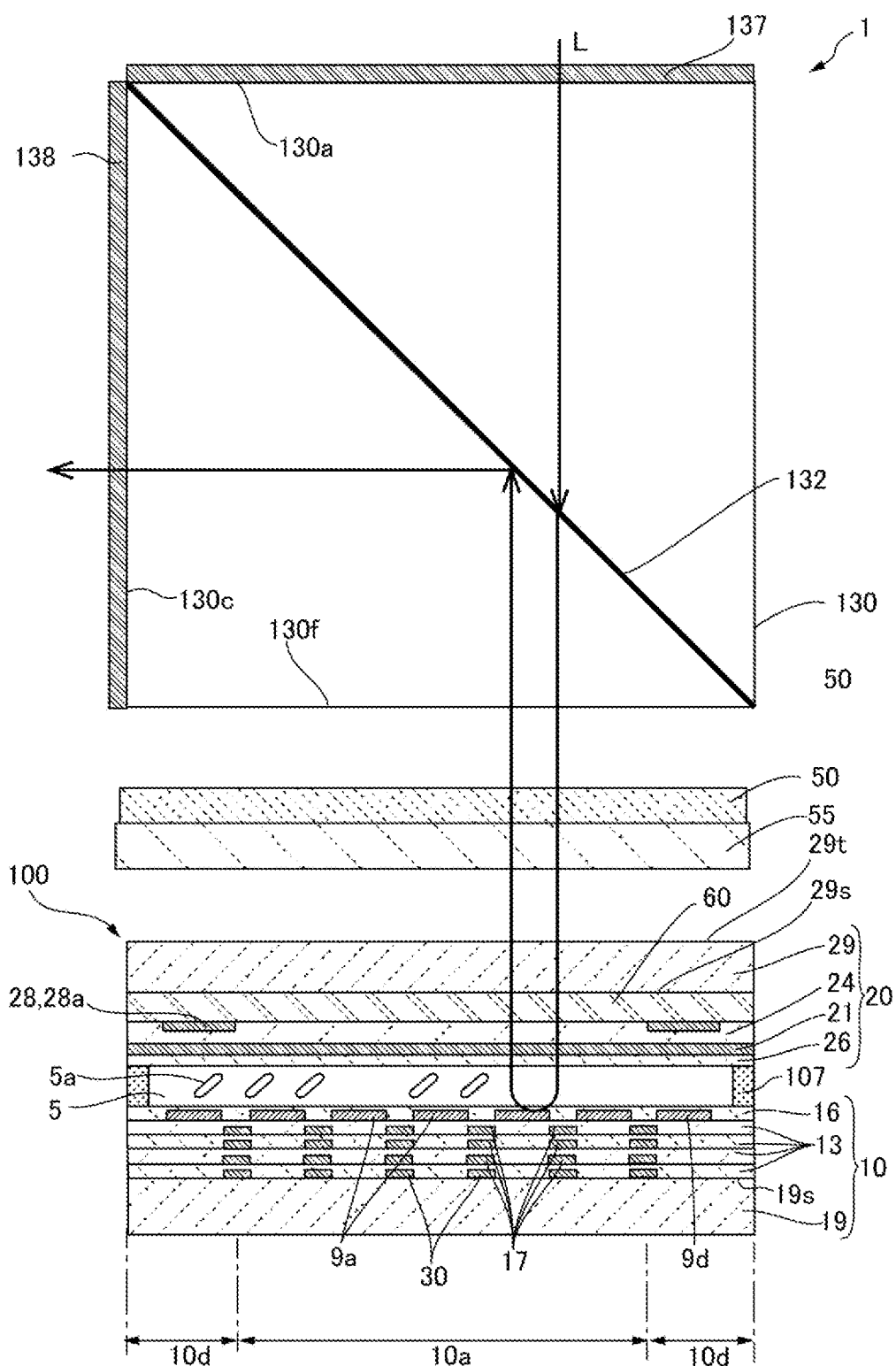
FIG. 13 is an explanatory diagram of a liquid crystal device according to Modified Example 1 of Exemplary Embodiment 4 of the present disclosure.

FIG. 13 is an explanatory diagram of a liquid crystal device 1 according to Modified Example 1 of Exemplary Embodiment 4 of the present disclosure. As illustrated in FIG. 13, in the present embodiment as well, the λ/4 phase difference plate 50 is formed of a multilayer film of an inorganic material layered on one surface of the light-transmitting substrate 55, as well as Exemplary Embodiment 4. The phase difference compensation layer 60 formed of the C plate is formed of a multilayer film of an inorganic material layered on the one surface 29t of the substrate body 29 on the liquid crystal layer 5 side in the second substrate 20. The rest of the configuration is the same as Exemplary Embodiment 1. In this aspect, since the phase difference compensation layer 60 is integrally provided with the liquid crystal panel 100, the same effect as that of Exemplary Embodiment 1 can be obtained, such as simplification of the configuration.

Modified Example 2 of Exemplary Embodiment 4

Figure 14:
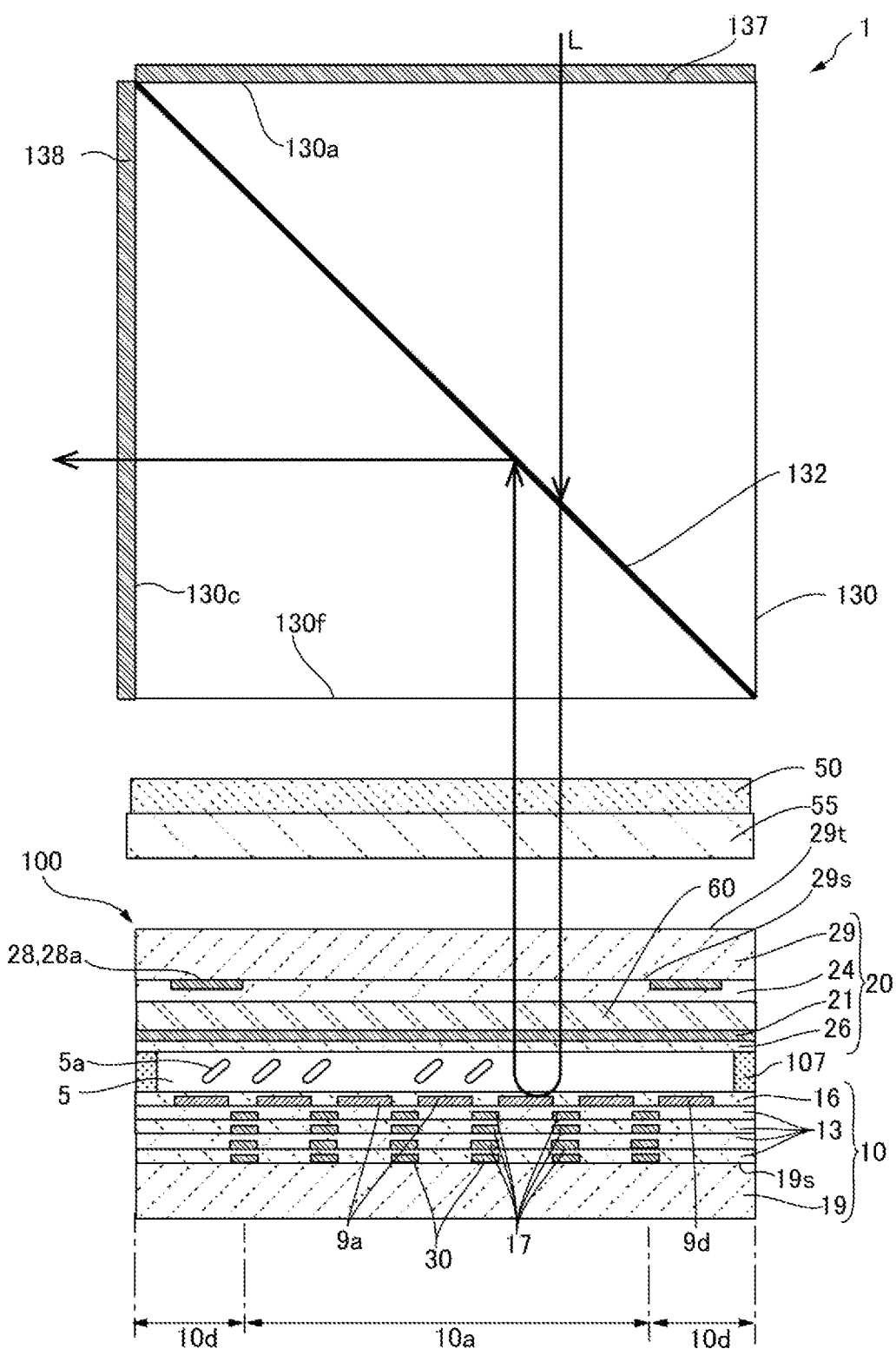
FIG. 14 is an explanatory diagram of a liquid crystal device according to Modified Example 2 of Exemplary Embodiment 4 of the present disclosure.

FIG. 14 is an explanatory diagram of a liquid crystal device 1 according to Modified Example 2 of Exemplary Embodiment 4 of the present disclosure. As illustrated in FIG. 14, in the present embodiment, the λ/4 phase difference plate 50 is formed of a multilayer film of an inorganic material layered on the one surface of the light-transmitting substrate 55, as well as Exemplary Embodiment 4. The phase difference compensation layer 60 formed of the C plate is formed of a multilayer film of an inorganic material provided between the protective film 24 and the common electrode 21 in the second substrate 20. The rest of the configuration is the same as Exemplary Embodiment 1. In this aspect as well, since the phase difference compensation layer 60 is integrally provided with the liquid crystal panel 100, the same effect as that of Exemplary Embodiment 1 can be obtained, such as simplification of the configuration.

Modified Example 3 of Exemplary Embodiment 4

The configuration employed in Exemplary Embodiment 4 and Modified Examples 1 and 2 thereof may be employed in a case where, for example, the light-transmitting substrate 40 for dust prevention is bonded by an adhesive or the like to the surface 29t of the substrate body 29 of the second substrate 20 on the opposite side to the liquid crystal layer 5, as described in Exemplary Embodiments 2 and 3.

Exemplary Embodiment 5

Figure 15:
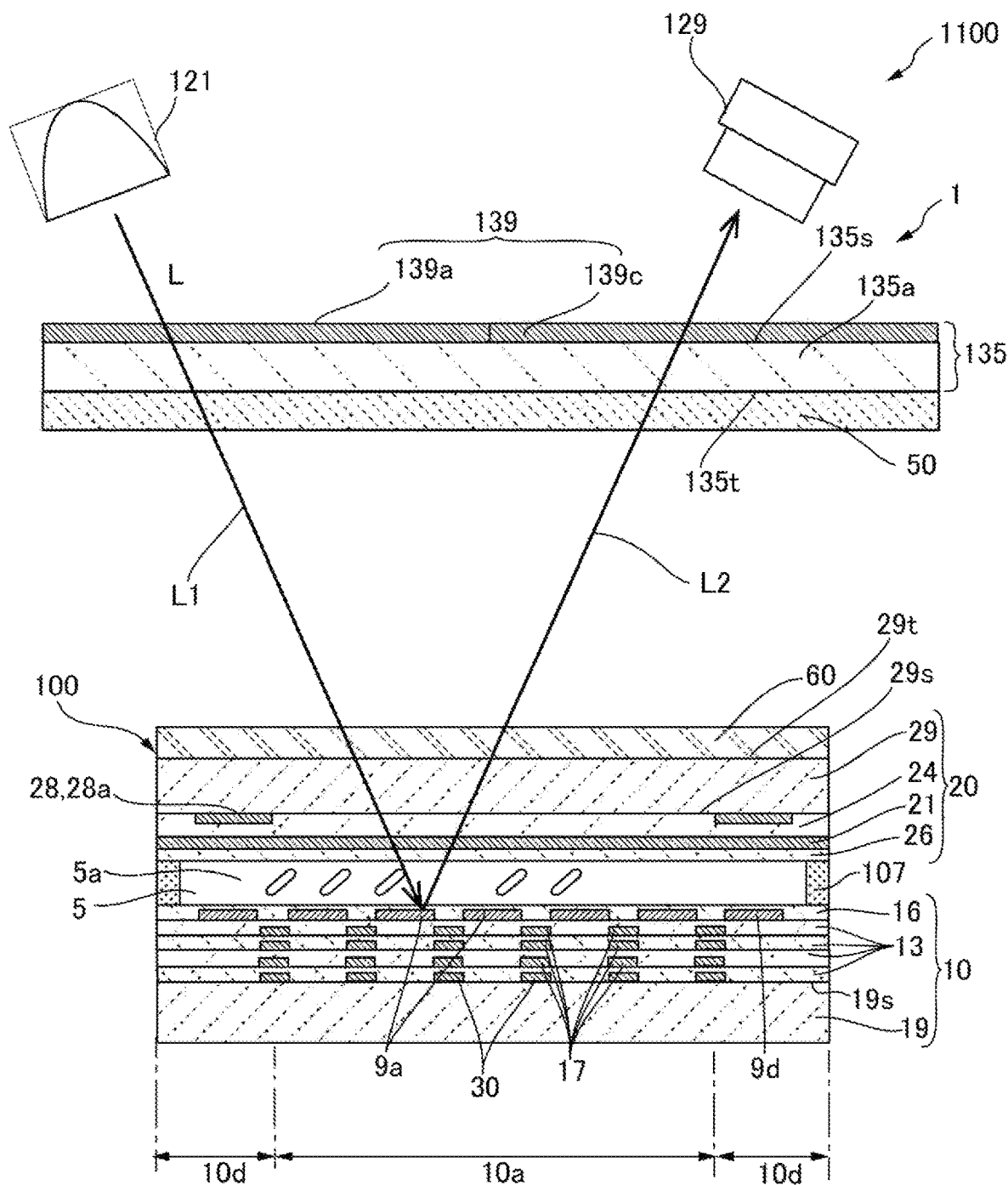
FIG. 15 is an explanatory diagram of the liquid crystal device according to Exemplary Embodiment 5 of the present disclosure.

FIG. 15 is an explanatory diagram of the liquid crystal device 1 according to Exemplary Embodiment 5 of the present disclosure. As illustrated in FIG. 15, the present embodiment also includes, a first polarizing plate, a second polarizing plate, and a liquid crystal panel 100, as well as Exemplary Embodiments 1 to 4, Here, in the optical path L, in a projection-type display device 1100, an incident optical path L1 from the light source unit 121 to the second substrate 20 of the liquid crystal panel 100, and an emission optical path L2 from the second substrate 20 toward the projection optical system 129 are inclined obliquely from the normal line to the second substrate 20. This liquid crystal device 1 projects, for example, an image generated by one liquid crystal device 1 onto a screen or the like by the projection optical system 129.

In this embodiment, a first polarizing plate 139a and a second polarizing plate 139c are arranged adjacent to each other in a direction facing in parallel to the second substrate 20 of the liquid crystal panel 100. Accordingly, the first polarizing plate 139a is arranged in the incident optical path L1, and the second polarizing plate 139c is arranged in the emission optical path L2.

In this embodiment, the first polarizing plate 139a and the second polarizing plate 139c are formed on one surface 135s of a common light-transmitting substrate 135a which is a base of an optical element 135. Here, the other surface 135t of the light-transmitting substrate 135a is an opposing surface that faces parallel to the second substrate 20 of the liquid crystal panel 100, and the λ/4 phase difference plate 50 is formed of a multilayer film of an inorganic material layered on the other surface 135t of the light-transmitting substrate 135a.

In the present embodiment as well, the phase difference compensation layer 60 formed of the C plate is integrally provided with the liquid crystal panel 100. For example, the phase difference compensation layer 60 is formed of a multilayer film of an inorganic material layered on the surface 29t of the substrate body 29 on the opposite side to the liquid crystal layer 5 in the second substrate 20. The rest of the configuration is the same as Exemplary Embodiment 1. In this aspect as well, since the phase difference compensation layer 60 is integrally provided with the liquid crystal panel 100, the same effect as that of Exemplary Embodiment 1 can be obtained, such as simplification of the configuration.

Modified Example of Exemplary Embodiment 5

In Exemplary Embodiment 5, the phase difference compensation layer 60 may be arranged at positions described with reference to Exemplary Embodiments 1 to 3. Further, the λ/4 phase difference plate 50 may be arranged as described with reference to Exemplary Embodiment 4.

Exemplary Embodiment 6

Figure 16:
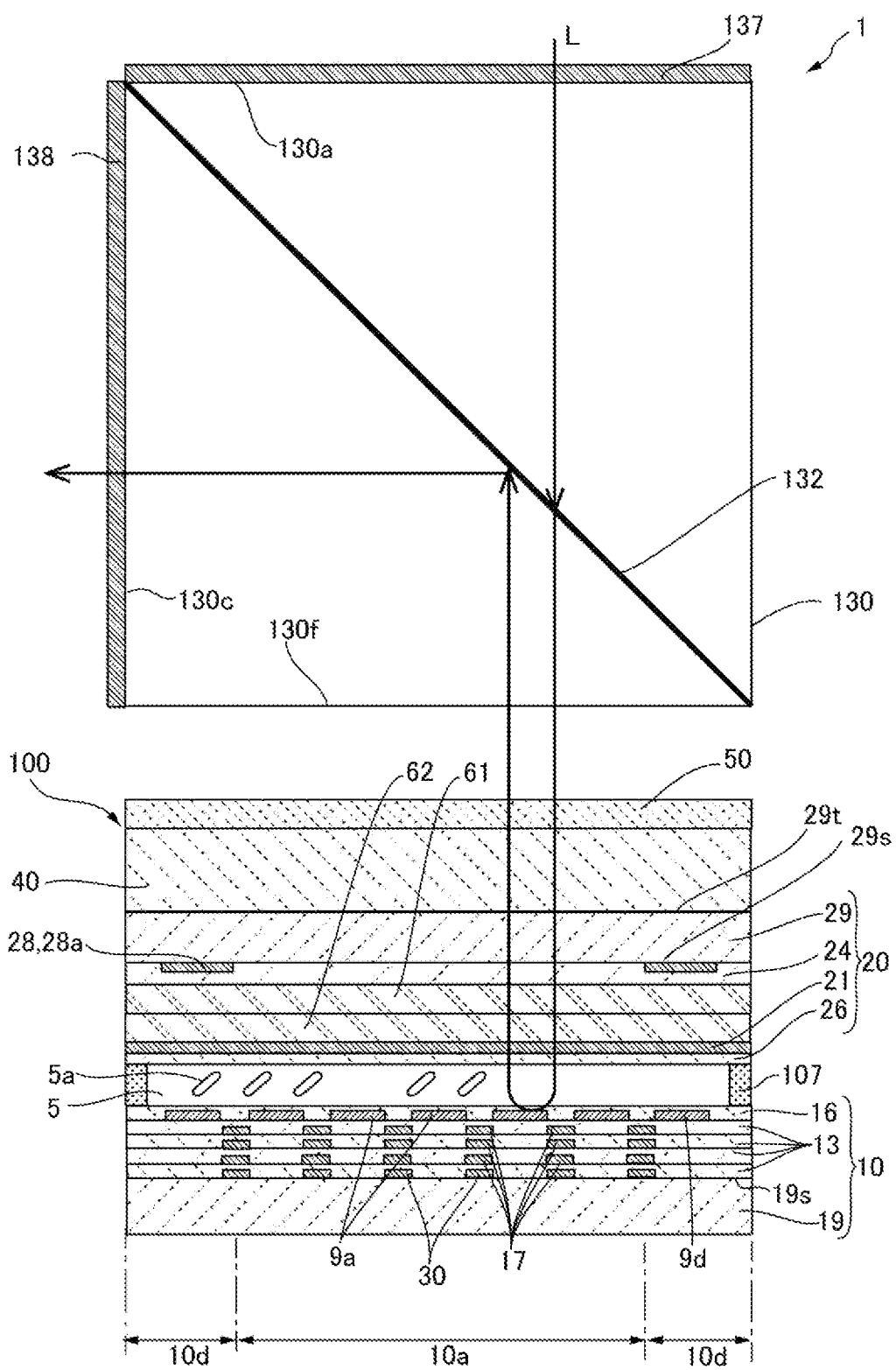
FIG. 16 is an explanatory diagram of the liquid crystal device according to Exemplary Embodiment 6 of the present disclosure.

FIG. 16 is an explanatory diagram of the liquid crystal device 1 according to Exemplary Embodiment 6 of the present disclosure. In Exemplary Embodiments 1 to 5, one phase difference compensation layer 60 is integrally provided with the liquid crystal panel 100, but two or more phase difference compensation layers may be integrally provided with the liquid crystal panel 100. For example, as illustrated in FIG. 16, in the liquid crystal panel 100, two phase difference compensation layers 61 and 62 are provided between the protective film 24 and the common electrode 21. The angular positions and the like of the phase difference compensation layers 61 and 62 are set so that the overall phase difference is suitably compensated.

For example, one of the two phase difference compensation layers 61 and 62 is a C plate made of a multilayer film of an inorganic material, and the other is an O plate made of a diagonally vapor-deposited film of an inorganic material such as tantalum oxide. In this case, the refractive index characteristics, thickness, and the like of each of the C plate and the O plate are set so that the overall phase difference is suitably compensated. Accordingly, it is possible to compensate the phase difference of the light incident on the liquid crystal layer 5 from the front direction and from the oblique direction.

Further, since the two phase difference compensation layers 61 and 62 are stacked each other, layers having a relatively small difference in refractive index are in contact with each other at an interface between the phase difference compensation layer 61 and the phase difference compensation layer 62. Therefore, reflection at the interface can be suppressed as compared with a case where a medium having a small refractive index such as a quartz substrate is present between the phase difference compensation layer 61 and the phase difference compensation layer 62. Note that in the present embodiment, the phase difference compensation layers 61 and 62 are provided on the liquid crystal device 1 based on Exemplary Embodiment 1. However, the phase difference compensation layers 61 and 62 may be provided in other embodiments to which the present disclosure is applied. Further, in the present embodiment, two phase difference compensation layers 61 and 62 are provided, but three phase difference compensation layers may be provided. Further, in the present embodiment, two phase difference compensation layers 61 and 62 are stacked each other, but may be stacked via another layer.

Modified Example of Exemplary Embodiment 6

Both of the two phase difference compensation layers 61 and 62 illustrated in FIG. 16 may be an O plate. The O plate has an optical axis that deviates from the normal line direction with respect to the first substrate 10 and the second substrate 20 and is directed to an oblique direction, and has optical anisotropy in the substrate plane and in the plane vertical to the substrate plane. Therefore, when providing two O plates, the two O plates have their optical axes directed to different directions when viewed from the normal line direction with respect to the liquid crystal panel 100, and the phase difference compensation layers 61 and 62 are arranged so that the orientation direction P of the liquid crystal molecules 5a is located within an angle range sandwiched by the optical axes of the two O plates.

Other Exemplary Embodiments

In the above-described liquid crystal device 1, an anti-reflective film formed of a stacked film of a low-refractive index layer and a high-refractive index layer may be formed on a surface that is in contact with air of both surfaces of each optical member. Accordingly, since reflection at an interface between each optical member and air can be suppressed, loss of display light due to reflection, generation of stray light, and the like can be suppressed. For example, since one surface of each of the first polarizing plate 137 and the second polarizing plate 138 is exposed, an anti-reflective film may be formed on the surface of the first polarizing plate 137 that is in contact with air and the surface of the second polarizing plate 138 that is in contact with air.

Further, since light of different wavelengths is incident on the liquid crystal devices 1r, 1g, and 1b illustrated in FIG. 1, the phase differences of the above-described λ/4 phase difference plates 50r, 50g, and 50g may be different, in the liquid crystal devices 1r, 1g, and 1b.

The present disclosure may be used as a measure against the disclination of a liquid crystal device used in a projection-type display device that shifts the axis of image light emitted from the liquid crystal device in a uniaxial direction or biaxial directions to enhance resolution.

Further, the electronic device to which the liquid crystal device 1 is applicable is not limited to the projection-type display device. For example, the liquid crystal device 1 may be used as a projection-type head-up display (HUD), a direct viewing-type head-mounted display (HMD), and a display unit of an information terminal device such as an electronic book, a personal computer, a digital camera, a liquid crystal television, a view finder-type or a monitor direct viewing type video recorder, a car navigation system, an electronic note book, and POS.

What is claimed is:

1. A liquid crystal device comprising:
   a reflection-type liquid crystal panel in which a first substrate provided with a reflection layer and a second substrate having light-transmissivity face each other via a liquid crystal layer;
   a λ/4 phase difference plate arranged in an optical path in which light incident from the second substrate side is reflected by the reflection layer and emitted from the second substrate side, the λ/4 phase difference plate being provided integrally with the liquid crystal panel in the optical path;
   a phase difference compensation layer that is also provided integrally with the liquid crystal panel in the optical path; and
   a polarized light separating element that is also disposed in the optical path, the liquid crystal panel and the polarized light separating element being separate members,
   wherein the polarized light separating element is a cubic-shaped polarized light separating prism, and
   wherein the polarized light separating element includes a first polarization plate, and a second polarization plate that is perpendicular to the first polarization plate.

2. The liquid crystal device according to claim 1, wherein in the optical path, an incident optical path to the second substrate and an emission optical path from the second substrate extend in a direction along a normal line to the second substrate.

3. The liquid crystal device according to claim 1, wherein in the optical path, an incident optical path to the second substrate and an emission optical path from the second substrate are inclined obliquely with respect to a normal line to the second substrate.

4. The liquid crystal device according to claim 1, comprising:
   a polarized light separating element having an opposing surface that faces the second substrate, wherein
   the λ/4 phase difference plate is provided at the opposing surface.

5. The liquid crystal device according to claim 1, wherein the λ/4 phase difference plate is provided at the second substrate.

6. The liquid crystal device according to claim 1, comprising:
   a light-transmitting substrate bonded to an opposite side of the second substrate from the first substrate, wherein
   the λ/4 phase difference plate is provided at a surface of the light-transmitting substrate on an opposite side from the second substrate.

7. The liquid crystal device according to claim 1, comprising:
   a light-transmitting substrate arranged facing the second substrate in the optical path, wherein
   the λ/4 phase difference plate is provided at the light-transmitting substrate.

8. The liquid crystal device according to claim 1, wherein the phase difference compensation layer is provided at the second substrate.

9. The liquid crystal device according to claim 8, wherein the second substrate includes a substrate body having light-transmissivity, and a light-transmitting electrode provided at a surface of the substrate body on the liquid crystal layer side, and
   the phase difference compensation layer is provided between the substrate body and the light-transmitting electrode.

10. The liquid crystal device according to claim 1, wherein
   the liquid crystal panel includes a light-transmitting substrate bonded to an opposite side of the second substrate from the first substrate, and
   the phase difference compensation layer is provided at a surface of the light-transmitting substrate opposite from the second substrate.

11. The liquid crystal device according to claim 1, wherein
   the liquid crystal panel includes a light-transmitting substrate bonded to an opposite side of the second substrate from the first substrate, and
   the phase difference compensation layer is provided between the light-transmitting substrate and the second substrate.

12. The liquid crystal device according to claim 1, wherein
   the λ/4 phase difference plate and the phase difference compensation layer are both made of an inorganic material.

13. The liquid crystal device according to claim 1, wherein
   the phase difference compensation layer is at least one of a C plate and an O plate.

14. The liquid crystal device according to claim 13, wherein
   in the phase difference compensation layer, the C plate and the O plate are stacked.

15. An electronic apparatus, comprising the liquid crystal device according to claim 1.

* * * * *